United States Patent [19]
Iino et al.

[11] Patent Number: 5,586,282
[45] Date of Patent: Dec. 17, 1996

[54] MEMORY SYSTEM EMPLOYING PIPELINE PROCESS FOR ACCESSING MEMORY BANKS

[75] Inventors: Hideyuki Iino; Hiromasa Takahashi, both of Kawasaki, Japan

[73] Assignee: Fujitsu Limited, Kawasaki, Japan

[21] Appl. No.: 340,312

[22] Filed: Nov. 14, 1994

Related U.S. Application Data

[63] Continuation of Ser. No. 848,968, filed as PCT/JP91/01124, Aug. 23, 1991, published as WO92/03791, Mar. 5, 1992, abandoned.

[30] Foreign Application Priority Data

Aug. 24, 1990 [JP] Japan .................................. 2-222774

[51] Int. Cl.⁶ ...................................................... G06F 12/06
[52] U.S. Cl. ...................... 395/405; 395/421.07; 395/496
[58] Field of Search .................................. 395/400, 425, 395/405, 421.07, 497.04, 496

[56] References Cited

U.S. PATENT DOCUMENTS

| | | | |
|---|---|---|---|
| 4,734,850 | 3/1988 | Torii et al. | 395/496 |
| 4,791,552 | 12/1988 | Natusch et al. | 305/550 |
| 4,809,161 | 2/1989 | Torii et al. | 395/405 |
| 4,851,990 | 7/1989 | Johnson et al. | 395/280 |
| 4,866,603 | 9/1989 | Chiba | 395/484 |
| 4,881,168 | 11/1989 | Inagami et al. | 395/800 |
| 5,125,084 | 6/1992 | Begun et al. | 395/375 |

FOREIGN PATENT DOCUMENTS

| | | |
|---|---|---|
| 0240032 | 10/1987 | European Pat. Off. . |
| 0283115 | 9/1988 | European Pat. Off. . |
| 0343988 | 11/1989 | European Pat. Off. . |
| 60-57447 | 4/1985 | Japan . |
| 61-294581 | 12/1986 | Japan . |
| 63-308656 | 12/1988 | Japan . |
| 1-152547 | 6/1989 | Japan . |
| 1-286056 | 11/1989 | Japan . |
| 87/04822 | 8/1987 | WIPO . |

*Primary Examiner*—Jack A. Lane
*Attorney, Agent, or Firm*—Staas & Halsey

[57] ABSTRACT

A memory access system employs a pipe-line process in which access can be carried out for a microprocessor using one cycle of two clocks and for a microprocessor using one cycle of one clock. Access speed of a main memory can be considerably improved ensuring applicability in general use. A transition request signal to a pipe-line is received, a control signal that continues as long as the cycle number corresponding to at least the address first-out number of the pipe-line immediately after the start of the pipe-line operation is produced. Concurrently, a data complete signal indicating the completion of data access for a bank is produced during the time that either of the above two signals is also generating an address latch signal synchronized to a clock signal and routed to respective banks, for executing high speed data access.

16 Claims, 26 Drawing Sheets

Fig.9

| STRIDE VALUE | | -6 | -5 | -4 | -3 | -2 | -1 | 0 | 1 | 2 | 3 | 4 | 5 | 6 | |
|---|---|---|---|---|---|---|---|---|---|---|---|---|---|---|---|
| | 1 | --- | 1 | 1 | 1 | 1 | 1 | 1 | 1 | 1 | 1 | 1 | 1 | 1 | --- |
| | 2 | --- | 2 | 1 | 2 | 1 | 2 | 1 | 2 | 1 | 2 | 1 | 2 | 1 | --- |
| | 4 | --- | 2 | 1 | 4 | 2 | 4 | 1 | 4 | 2 | 4 | 1 | 4 | 2 | --- |

BANK NUMBER

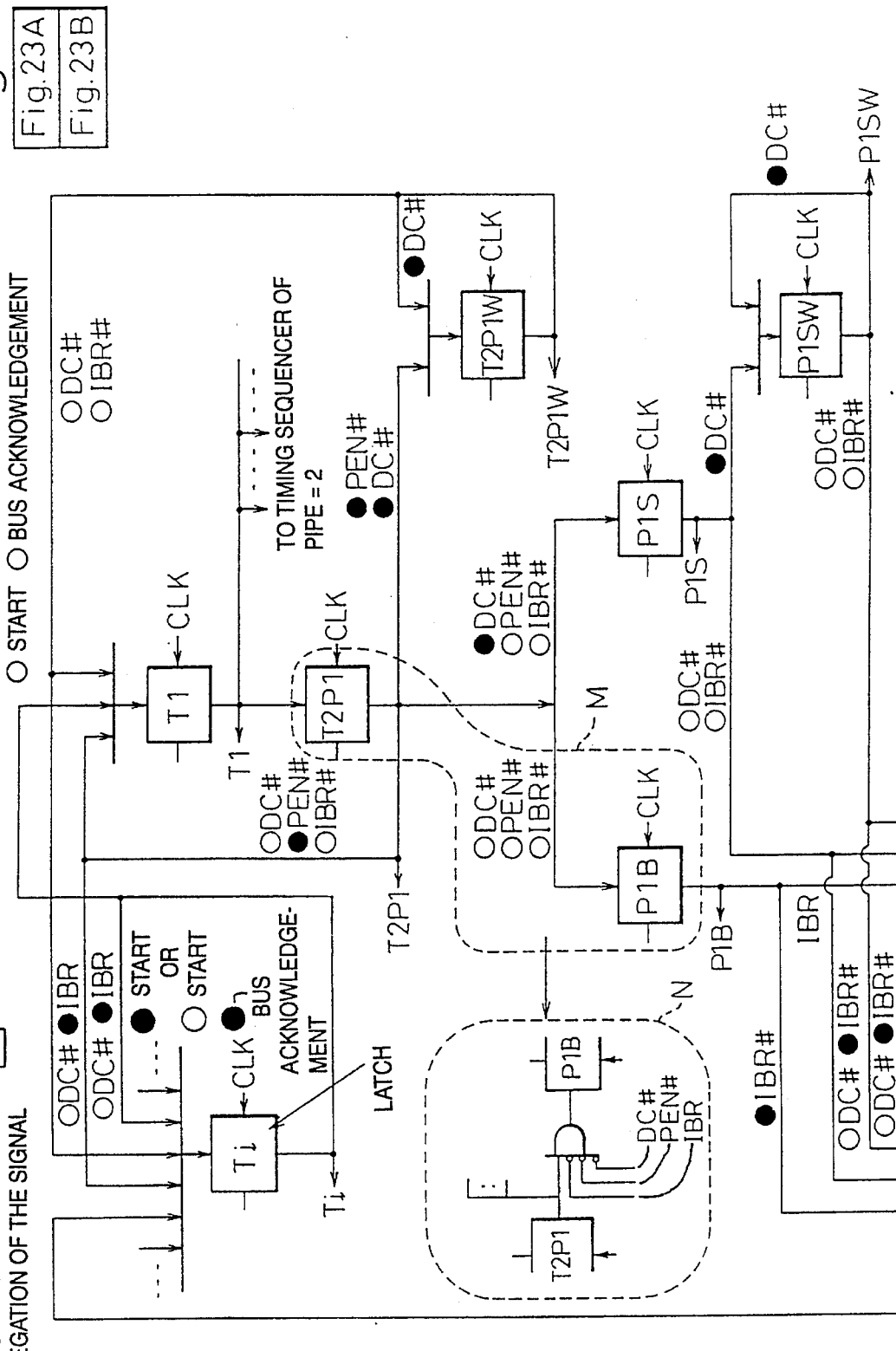

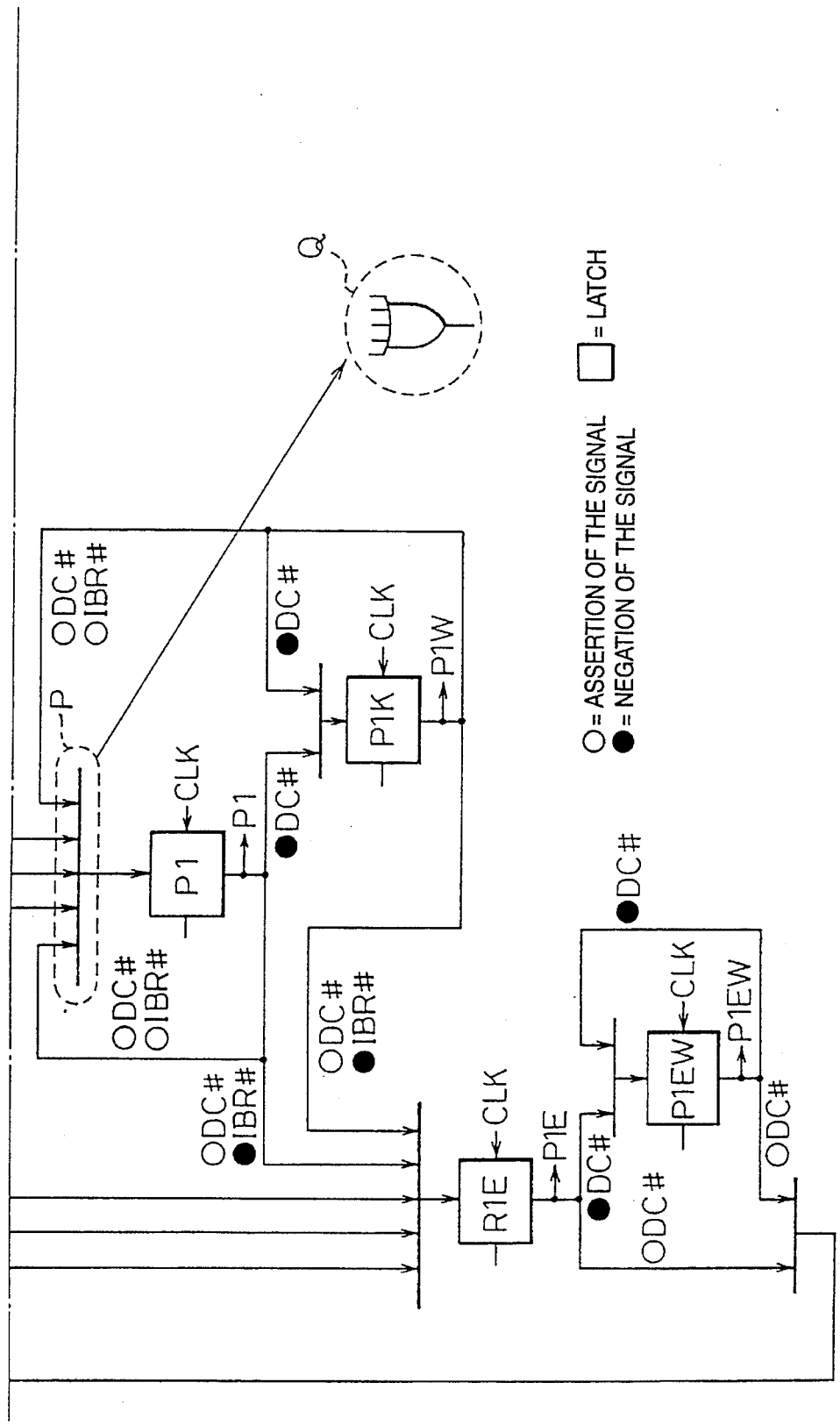

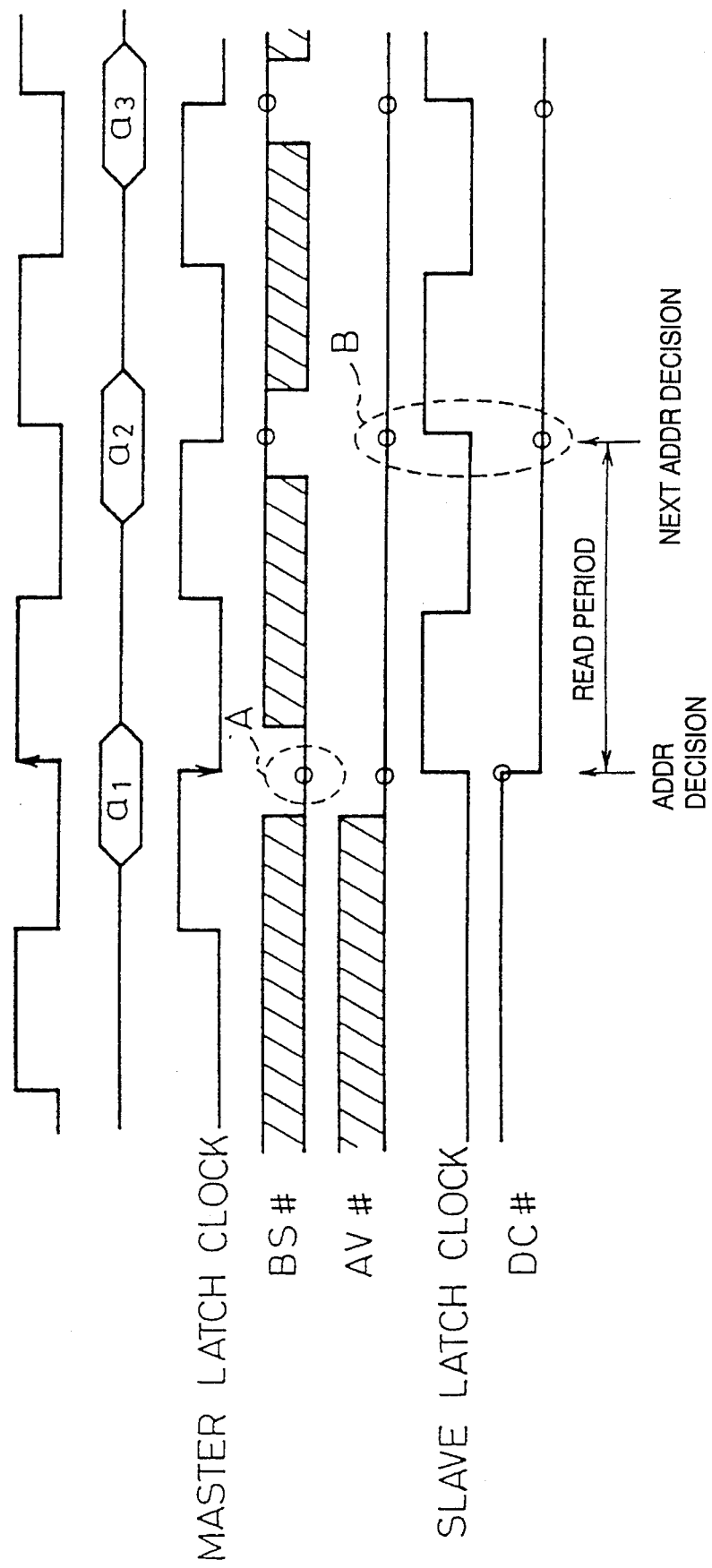

MEMORY SYSTEM EMPLOYING PIPELINE PROCESS FOR ACCESSING MEMORY BANKS

This application is a continuation of application Ser. No. 07/848,968, filed as PCT/JP91/01124, Aug. 23, 1991, published as WO92/03791, Mar. 5, 1992, now abandoned.

FIELD OF THE INVENTION

The present invention relates to a memory access system using a microprocessor, and in particular to a memory access system using a microprocessor capable of partitioning an address space into a plurality of regions called banks to improve access speed by accessing the respective regions in parallel.

DESCRIPTION OF THE RELATED ART

Conventionally, a procedure for improving a processing speed of computers has been proposed wherein a memory capable of operating at a very high speed, called a cache memory, is disposed between a main memory and a processor. The procedure provides the average access time of the computer to be upgraded to a higher speed corresponding to the access time of the cache memory.

The cache memory is ordinarily based on a burst transition (at the time of read) access. FIG. 1 is a timing chart showing an example of a bus cycle of the microprocessor when accessing a two-clock basic cycle. In FIG. 1, CLK depicts a clock signal, ADDRESS an address data for a read or write output on a bus from the microprocessor, BS# a control signal for designating the start of the bus cycle (logic of the signal and CLK is taken and the address data is latched), DATA a read (or write) data, DC# a signal designating that the read-out data is effective (or completion of write of the write data), where "#" represents negative logic and "O" represents timing.

In this example, one cycle (basic cycle) is set to a length corresponding to two clock cycles to prevent a so called "bus conflict" wherein data of a read cycle and data of a write cycle collide on the bus. Thus, a series of operations are executed by the basic cycle of a two clock cycle length. The read (or write) address is fed on the bus and after the read (or write) address is latched by timing of BS# variation, read (or write) data are read (or written).

However, a miss can arise, such as required data often does not exist within the cache memory, which has a smaller capacity compared to the main memory. In the event of such a miss, the contents of the cache memory is renewed at any time by the contents of the main memory but the same lowers the operation speed of the computer depending on the access speed of the main memory.

For such drawbacks countermeasures are proposed as below:

(1) the capacity of the cache memory is enlarged, (2) a hit-rate is upgraded by improving the algorithm of caching of the cache memory, and (3) a high speed/high characteristic element like a cache memory is employed for the main memory.

However, problems arise because the countermeasure (1) is limited with respect to system cost, (2) can reduce the miss-hit ratio but it is difficult to eliminate it completely, and (3) requires a larger amount of system cost proportional to the increase of the capacity of the main memory. Therefore, any of the above countermeasures do not resolve the problems.

To meet the requirement of a large scale mathematical computation system in a computation field for science and technology there is provided a computer capable of a vector arithmetic operation. For such a vector operation, for example, during an operation for vertical, laterally aligned data such as a matrix, the cache memory capable of only a read of the laterally aligned data produces, on the read of the vertically aligned data, a considerable waste of operation and is not suitable therefor.

Since the vector operation deals with large scale data, the cache memory finally causes a caching miss because an ordinary cache memory often cannot contain all the data. In the event of the caching miss, the main memory is accessed, which causes a deterioration of the characteristics.

A read/write speed of a general main memory is lower than that of the cache memory, which may carry out read/write by a high speed basic cycle. For example, consider a main memory to operate a one read (or write) cycle by a four-clock operation, such a structure of the main memory is shown in FIG. 2.

The read or write operation in the structure is shown in a timing chart of FIG. 3. As is apparent from the drawing, in the read or write operation, although a basic cycle at the microprocessor side is completed by two clock cycles, the main memory side requires four clock cycles at every cycle before a signal DC#, which designates the read data to be in effect (or completion of write of the write data), is returned. Accordingly, a problem arises in the inability to improve the speed because the microprocessor stops operation during the time that a wait cycle, corresponding to two clock cycles, is produced at respective cycles.

In the conventional example to solve the problems, it is well known that the main memory is divided into a plural number, as shown in FIG. 4. For example, an address space of the main memory is partitioned into two pieces that are referred to as a BANK.

It is assumed that one bank has an address space of W×D, where W corresponds to a block length with a predetermined data width and D corresponds to the number of blocks and further to the addresses used among the blocks with each other and positioned at the same height as adjacent banks are continued.

Here, if the least significant address to the most significant address are continued for the two-bank main memory, the accesses are sequentially executed in the order of:

|   | [bank-0 block L]   | → | [bank-1 block L]   |
|---|--------------------|---|--------------------|
| → | [bank-0 block L-1] | → | [bank-1 block L-1] |
| → | [bank-0 block L-2] | → | [bank-1 block L-2] |
|   | :                  |   | :                  |
| → | [bank-0 block 2]   | → | [bank-1 block 2]   |
| → | [bank-0 block 1]   | → | [bank-1 block 1]   | where the least significant block is represented by L and the most significant block by 1.

By using the main memory having the partitioned banks, "pipe-line" operations can be carried out as below.

In FIG. 5, by operations that address data designating an optional address in bank 0 and the other address data designating an optional address in bank 1 are output repeatedly in the order of basic cycles $C_1, C_2, C_3, \ldots$, a read (or write) data can be obtained, after a time lapse of the cycle number (the address first-out number) resulting from the total bank number minus one basic cycle, or on and after the basic cycle $C_2$, in appearance, at every cycle basis The address first-out number indicates the number of address components which have been output by the microprocessor without waiting for completion of a current read or write operation, in an address-data-pipeline mode.

Accordingly, the read data corresponding to the address of the basic cycle $C_1$ is obtained by the next basic cycle $C_{i+1}$, and an output operation of the address data and read (or write) operation of the read (or write) data are executed in parallel with a pipe-line operation of the stage number corresponding to the bank number, thus the main memory with a lowered speed compared to the cache memory can be utilized at a high speed corresponding to the cache memory.

However, in the conventional memory access devices, latch timing of the address data is determined by a rising edge of a bus control signal "BS#" and a clock signal "CLK", and concurrently detects the timing of the read (or write) data determined by a signal "DC#" designating effectiveness (or completion of write of the write data) of the read data. In connection with the foregoing, the following problems arise:

(1) Due to the requirement for determining a logic level around the time of a rise of the signal "BS#", one cycle must be equal to at least the length corresponding to two clock cycles, thus resulting in an inability to perform a high speed one-clock cycle operation. The processor for carrying out the vector operation requires high speed processing of a large amount of data, which is not met because of a lower access speed such as a two-clock cycle operation.

(2) For the partitioned banks, the address can be latched at every cycle, for example, only by continuously asserting every time using BS# but without repeating the assert and negate. Hence there is a possibility of a one-clock cycle operation. However, this results in only carrying out a one-clock cycle operation. In this process, a main memory dedicated to the microprocessor having basic clocking of one-clock cycle prevents the other microprocessor employing basic clocking from accessing the main memory, thus a problem arises with respect to applicability in general use.

SUMMARY OF THE INVENTION

The present invention has been made to solve the above-mentioned problems. An object of the invention is to provide a memory access system using a microprocessor capable of accessing by using one cycle of one clock and one cycle of two clocks to greatly improve the access speed of a main memory to ensure applicability in general use.

In the first aspect of the memory access system according to the invention to achieve the object a microprocessor comprises a data processing means for processing data, an address generating unit for generating an address for accessing a main memory, and a decision unit for determining a normal access mode of an address-data-pipe-line access mode. The address generating unit renews the address in a shorter period than that of the normal access mode during the time of the address-data-pipe-line access mode.

In the second aspect of the memory access system according to the invention, a memory access device for executing data access in a pipe-line manner for a bank of a main memory, a memory access device comprises a pipe-line operation detect unit for detecting the start of the pipe-line operation, a control signal generating unit for generating a control signal that continues as long as the cycle number corresponding to at least the address first-out number of a pipe-line immediately after the start of the pipe-line operation, an indicating signal generating unit for generating a data complete signal that indicates the completion of data access for the bank, a latch signal generating unit for generating an address latch signal in synchronization with a clock signal during the time that either the control signal or the display signal is generating, and a dividing unit for routing the address latch signal to respective banks. The address first-out number indicates the number of address components which have been output by the microprocessor without waiting for completion of a current read or write operation, in an address-data-pipeline mode.

In the third aspect of the memory access system according to the invention, a data processing system in which an address space of a main memory is partitioned into equal intervals by a predetermined data width, the partitioned blocks are formed into "n" pieces of banks by address-connecting the partitioned blocks at every nth block, and data access for respective banks can be executed in a pipe-line manner. A data processing system comprises a pipe-line enable signal generating unit for generating a pipe-line enable signal that is a dedicated input signal required by a pipe-line bus, a data processing unit for detecting the start of pipe-line operation and for generating a control signal that continues as long as the cycle number corresponding to at least the address first-out number of the pipe-line immediately after the start of the pipeline operation, an indicating signal generating unit for generating a data complete signal for indicating the completion of a data access for the bank, a latch signal generating unit for generating an address latch signal in synchronization with a clock signal during the time that either the control signal or the data complete signal is generating, and a dividing unit for routing the address latch signal to the respective banks. The data processing unit comprises an address producing means having an input terminal that is informed of bank information, such as the bank number of the main memory, a stride value of address-producing and the like, and for generating a signal that designates the data address depending on an input signal. The data processing means also comprises a bus control unit for outputting the pipe-line enable signal, and upon input of the data complete signal for outputting a bus start signal designating the start of the pipe-line operation, a data strobe signal designating the termination of the pipe-line operation, and a read/write display signal designating a read/write, and upon entering a pipe-line cycle for outputting an address valid signal designating a decision of a pipe-line address, a vector operation unit capable of a vector arithmetic operation by one clock, and a load/store pipe unit connected to the vector operation unit through an inner data bus and capable of exchanging data with the vector operation unit using one clock.

In the fourth aspect of the memory access system according to the invention, a method of processing data using a pipe-line process in which an address space of a main memory is a partitioned into equal intervals by a predetermined data width, the partitioned blocks are formed into "n" pieces of banks by address-connecting the partitioned blocks at every nth block, and data access for respective banks can be executed in a pipe-line manner. A method of processing data comprises a start step for starting a pipe-line operation by asserting a pipe-line enable signal that is a dedicated input signal required by a pipe-line bus, a valid signal generating step for generating a dedicated address valid signal designating a decision of a pipe-line address upon entering the pipe-line operation, a start signal generating step for generating a bus start signal that continues as long as the cycle number corresponding to at least the address first-out number of the pipe-line immediately after the start of the pipe-line operation, an indicating signal generating step for generating a data complete signal designating completion of the data access for the bank, a latch signal generating step for generating an address latch signal in synchronization with a clock signal when the dedicated signal and the data complete signal simultaneously exist or the control signal exists, and a dividing step for routing the address latch signal to respective banks.

According to the invention, a control signal that continues as long as the cycle number corresponding to at least the first-out number of the pipe-line operation immediately after the start of the pipe-line operation is produced, and concurrently a data complete signal for indicating the completion of the data access for the banks is produced. An address latch signal in synchronization with the clock signal is produced during the time that either of the two signals is generating. The address latch signal is routed to respective banks.

BRIEF DESCRIPTION OF THE DRAWINGS

FIG. 9 is the logical pipe-line number being set depending on the bank number and an address stride of a main memory, FIG. 24 is a bus timing chart of the device in FIG. 17.

DESCRIPTION OF THE PREFERRED EMBODIMENTS

The invention will be described based on the drawings as below, and a principle of a method of processing data will be explained in advance of the description of a memory access system using a pipe-line processing according to the invention.

Figure 1:
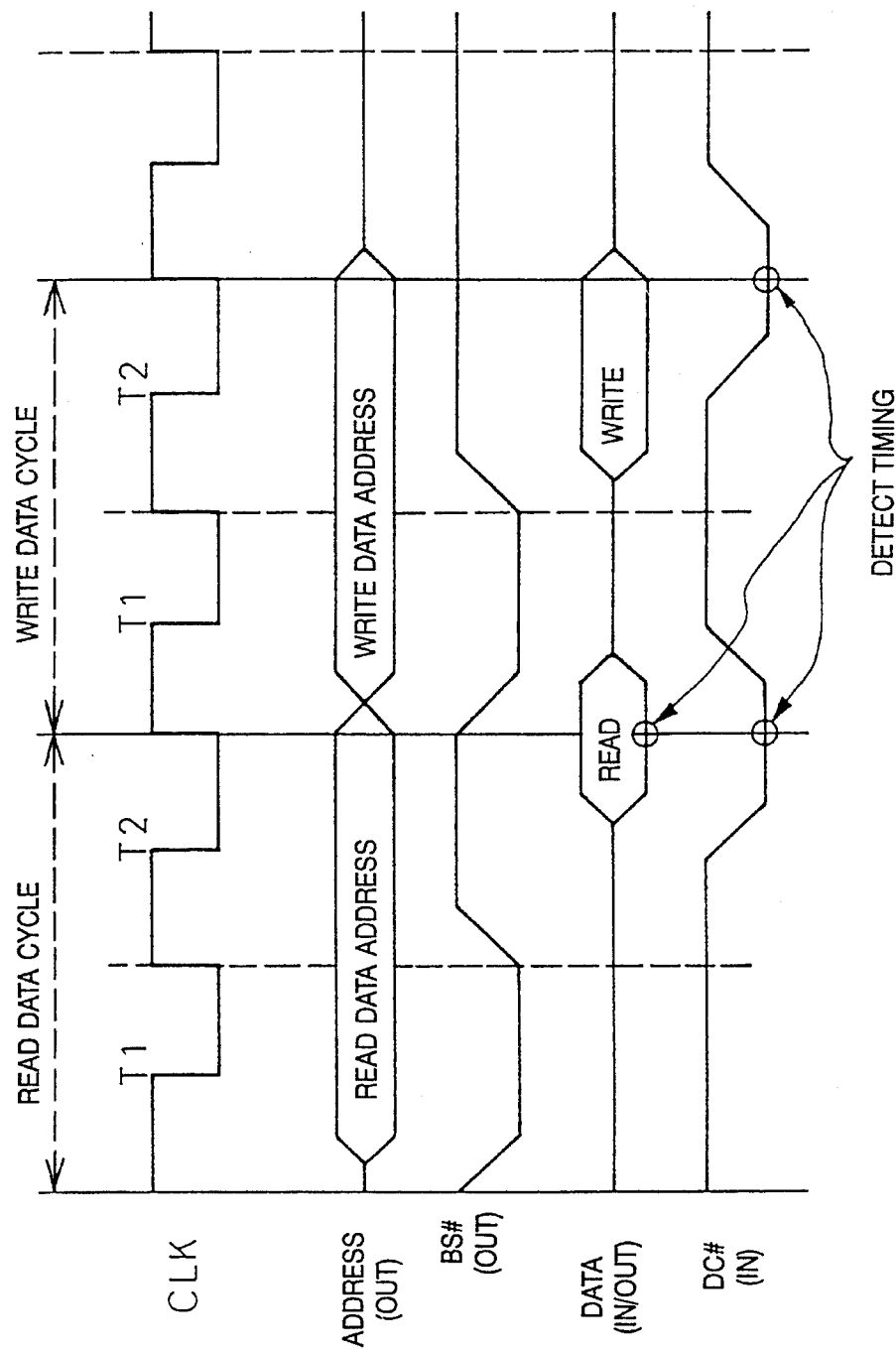
FIG. 1 is a bus timing chart of a cache memory of a two-clock basic cycle.
Figure 2:
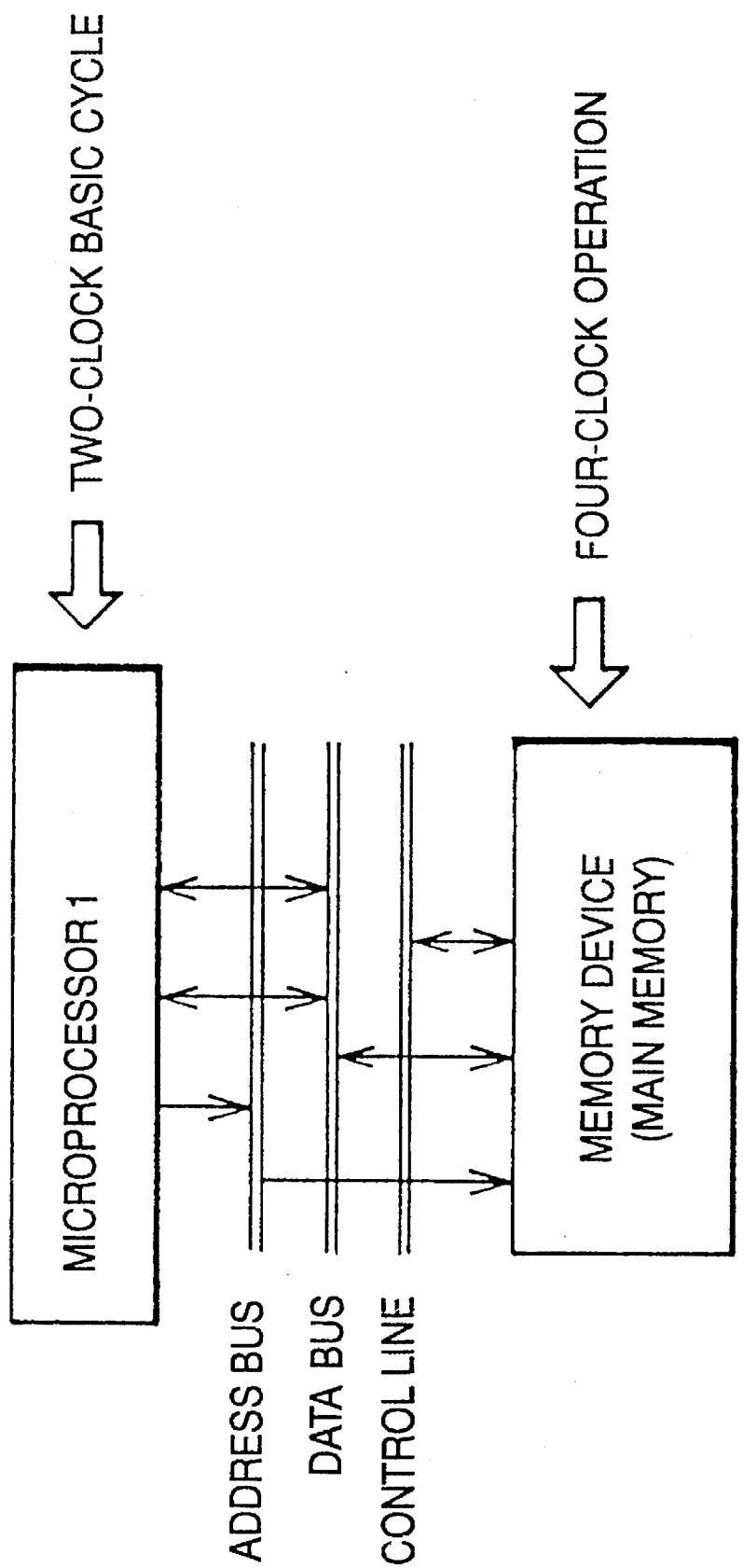
FIG. 2 is a connection diagram of a microprocessor having a two-clock basic cycle with a memory device having a four-clock operation.
Figure 3:
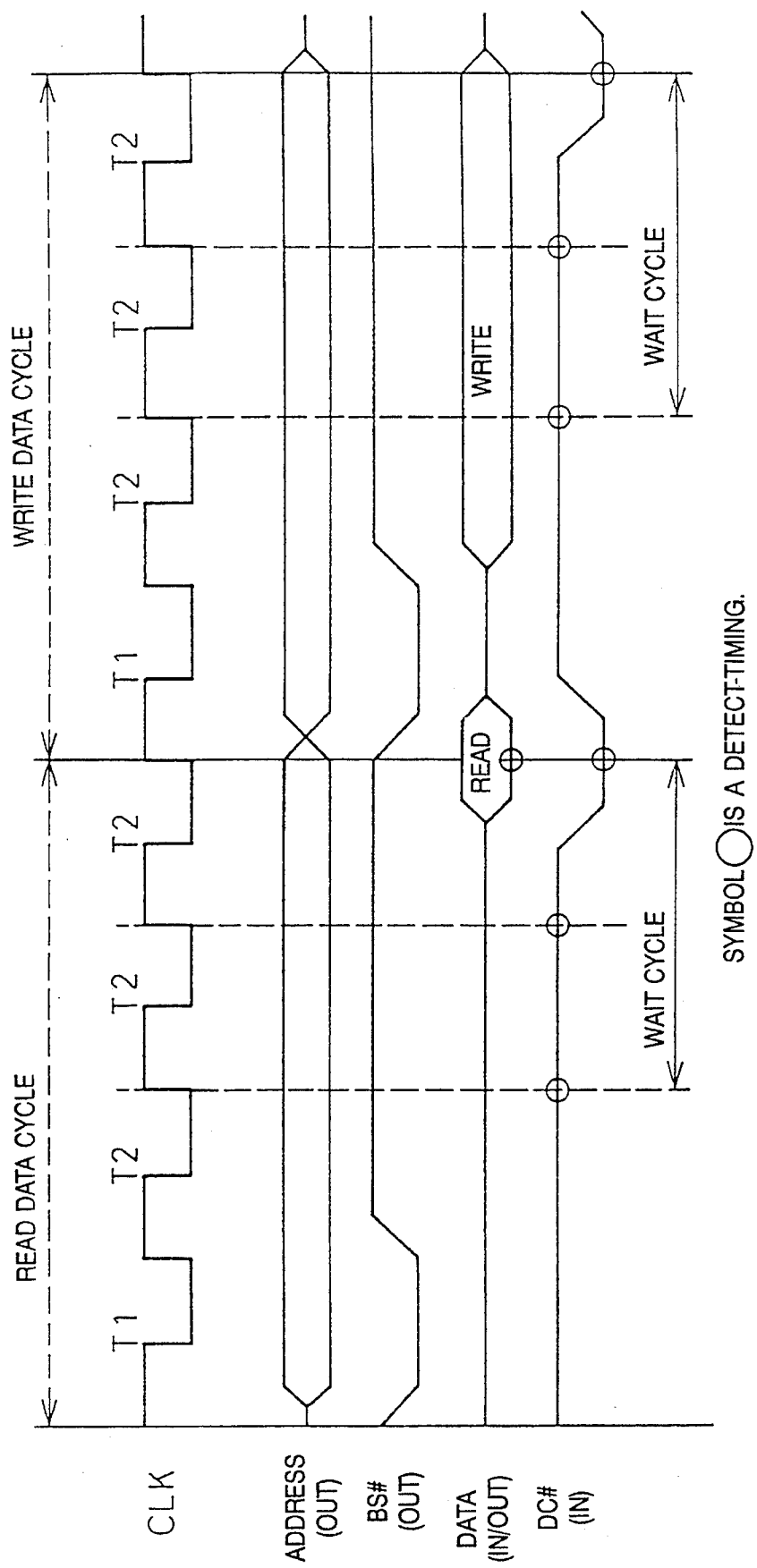
FIG. 3 is a bus timing chart of the structure in FIG. 2.
Figure 4:
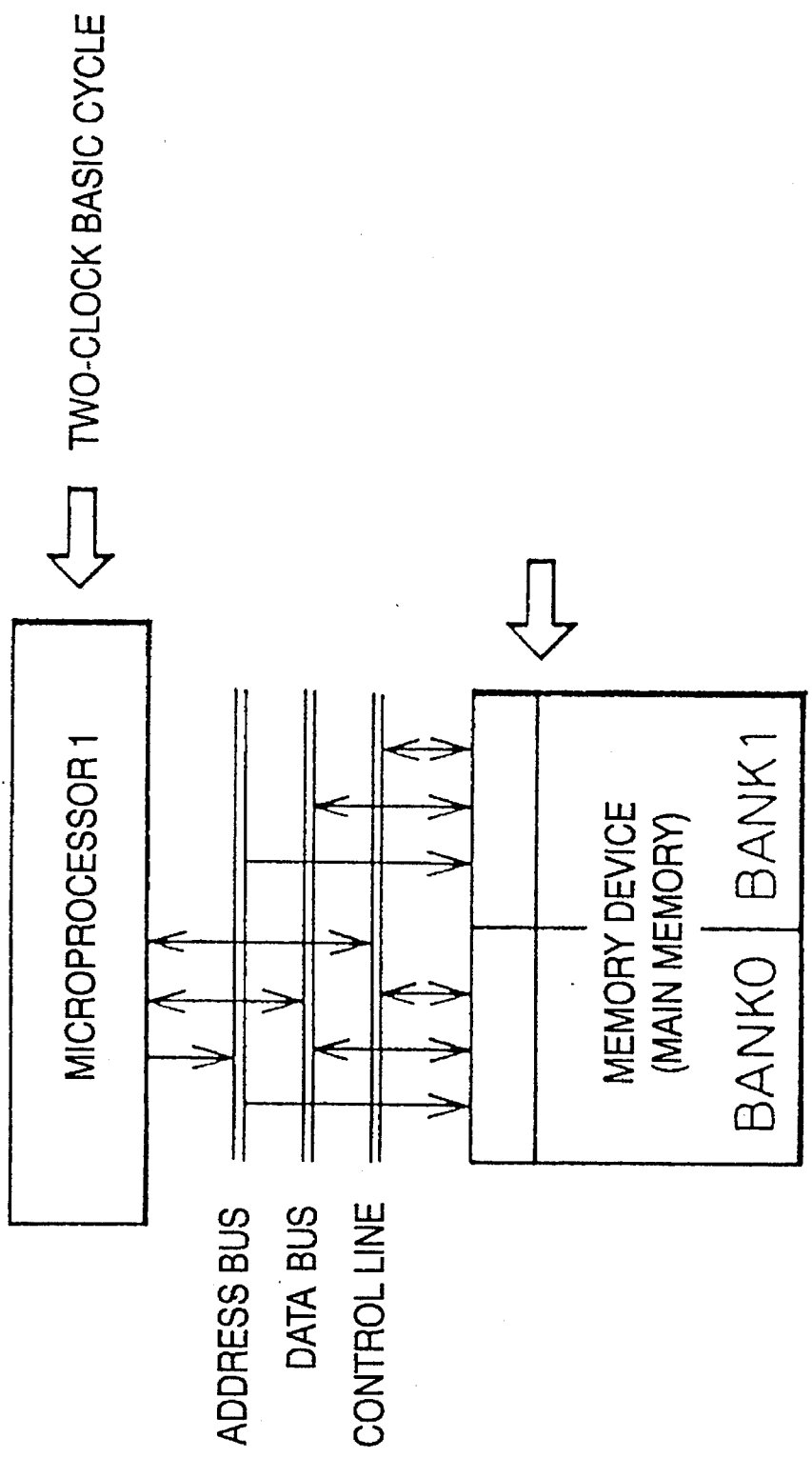
FIG. 4 is a connection diagram of a microprocessor in case of a partitioned main memory for realizing a pipe-line.
Figure 5:
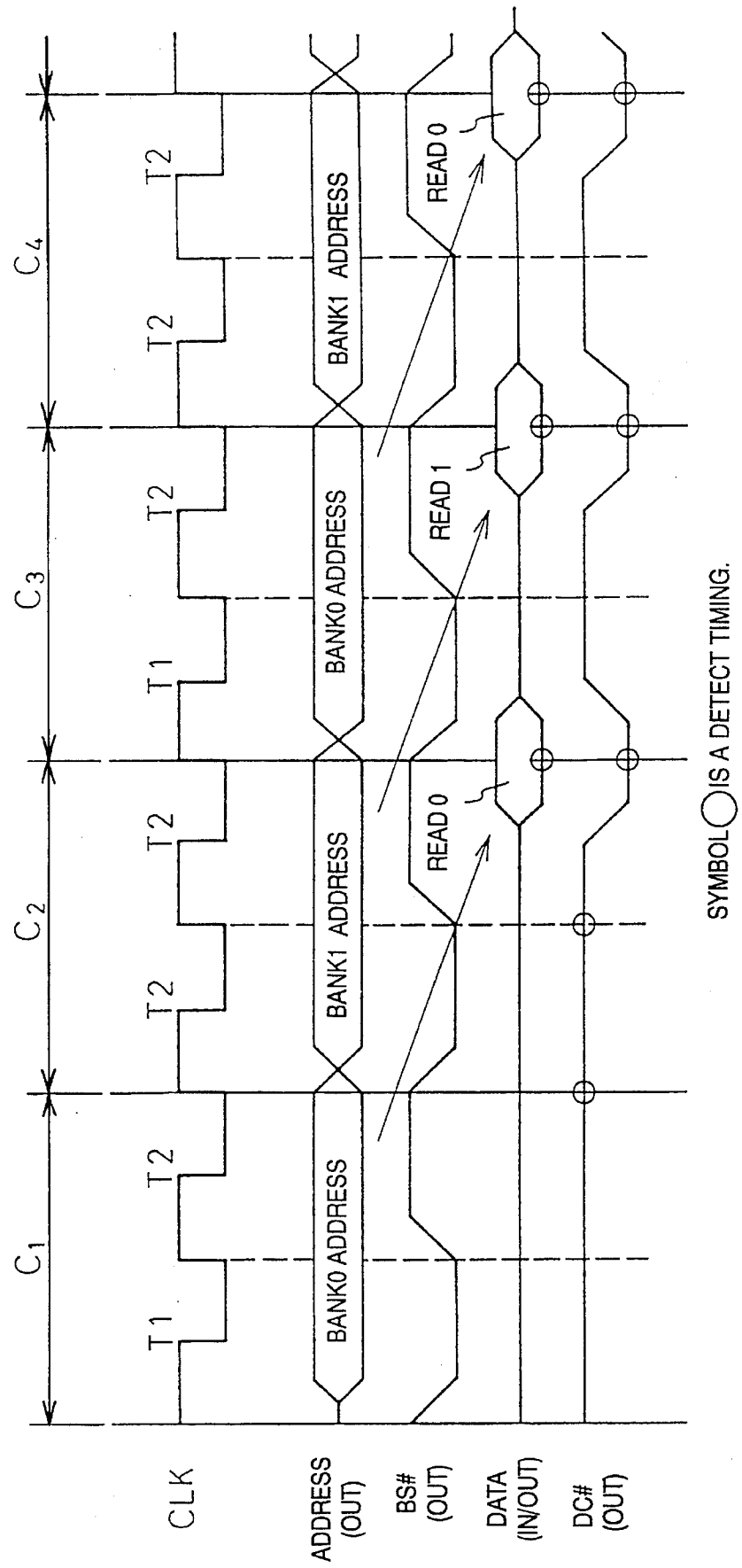
FIG. 5 is a bus timing chart of the structure in FIG. 4.
Figure 6:
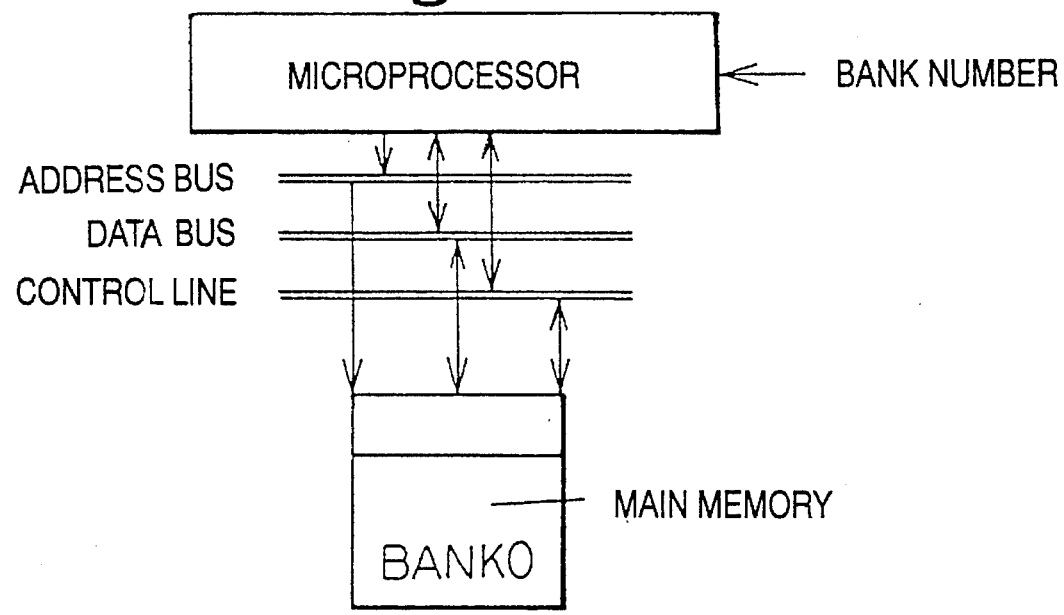
FIG. 6 is a conceptual view of the pipe-line number 1 for an explanation of principle of the invention.
Figure 7:
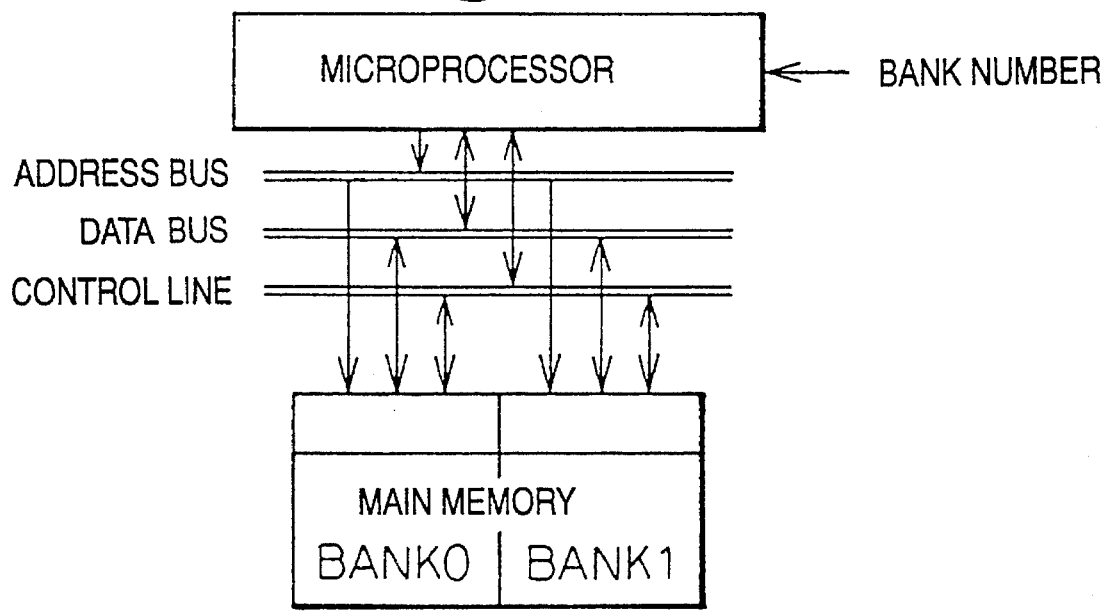
FIG. 7 is a conceptual view of the pipe-line number 2 for an explanation of a principle of the invention.
Figure 8:
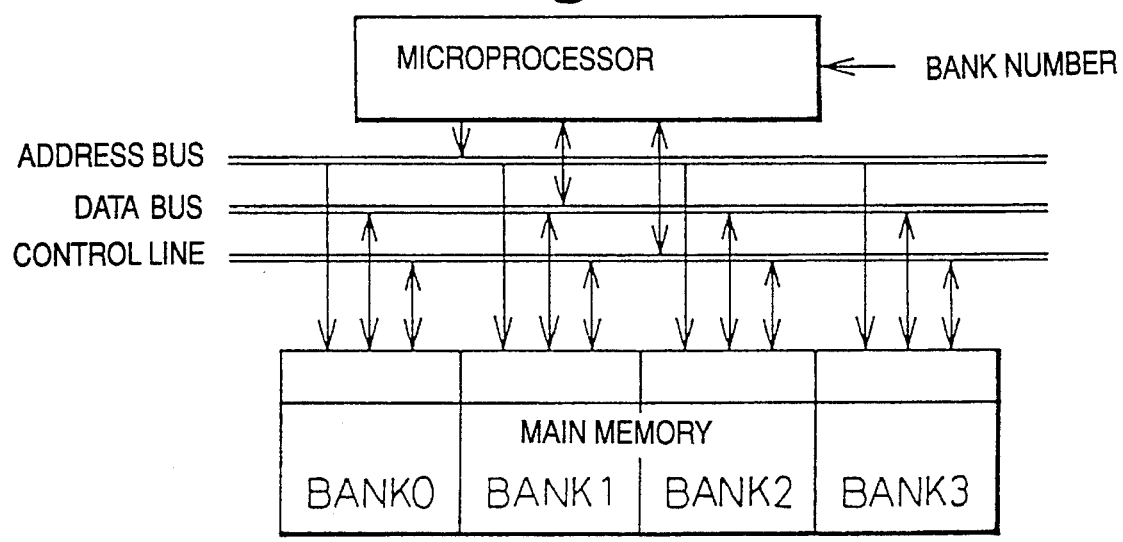
FIG. 8 is a conceptual view of the pipe-line number 4 for an explanation of a principle of the invention.

FIGS. 6 to 8 show examples of formations of various pipe-lines with the "physical" pipe-line stage numbers respectively of one stage, two stages and four stages, where the bank numbers of respective drawings correspond to the pipe-line numbers. In the formations of the drawings there are shown a main memory formed of one bank (BANK 0) in FIG. 6, two banks (BANK 0, BANK 1) in FIG. 7, and four banks (BANK 0, BANK 1, BANK 2, BANK 3) in FIG. 8.

An address bus and a data bus, and a microprocessor through a control line are connected to the main memory, and the numbers of the banks in the main memory can be sent from an external terminal to the respective microprocessors. Accordingly, for example, an external terminal for informing the bank number and a register for setting the bank number and the like are provided on the microprocessor.

The microprocessor can suitably select the logic pipe-line number depending on an address variation width at the time of a data access.

The variation width of the address is defined as a stride value (one data width), and the substantial pipe-line number determined by the bank number or the stride value is as shown in FIG. 9.

In FIG. 9, consider the execution of the data access when the stride value=1, where bank "n" (a natural number) is accessed on the first data access, bank n+1 is accessed on the next data access, and bank n+2 is accessed on the following data access. In this process, the adjacent banks are sequentially accessed at an interval of the bank data width, thus the logic pipe-line number and bank number (or the physical pipe-line number) are equal to each other.

When the stride value is equal to, for example, two times the bank data width (stride value=2), bank "n" is accessed on the first data access, and bank n+2 is accessed on the next data access. In this process, every second bank is accessed, and the logic pipe-line number is "one stage" at the bank number 1 and also "one stage" at the bank number 2 and "two stages" at the bank number 4.

In this way, the bank number in this configuration and the logic pipe-line number depending on the address stride can be set independently of the physical pipe-line number, and the pipe-line bus operation is executed depending upon that logic number.

The following are features on the bus timing of the memory access system according to the invention:

(1) a dedicated input signal (pipeline enable signal) PEN# required by the pipe-line bus is provided;

(2) a dedicated signal (address valid) AV# is provided for designating an enter to a pipe-line cycle and determination of the pipe-line address;

(3) a bus start signal BS# is processed as described later. As a result, in response to an input of a signal PEN#, the microprocessor starts the pipe-line bus operation of the logic pipe-line number in FIG. 9. If a data complete signal DC# returns when the signal AV# is asserted, the microprocessor uses the signal DC# as a renewing signal of the address or as a latch signal of the external circuit. The signal BS# is in asserted immediately after the start of the pipe-line operation, the assertion is maintained continuously at least as long as the cycle number corresponding to the address first-out (or the address first produced and latched by the microprocessor) number of the pipe-line. The signal BS# is used instead of the signal DC# in (2). If the address is not latched in response to the signals AV# and DC#, the address is latched in response to the signal BS# instead of the signal DC#.

The pipe-line bus can execute the first-out of the addresses corresponding to the bank number, and the addresses exceeding the bank number enable the first-out operation but do not enable a renewing operation, until the signal DC# for the bank previously accessed is returned.

The features of a bus timing for the method of memory access of the invention as abovementioned, or a bus timing operation corresponding to the pipe-line number or the bank number in FIGS. 6 to 8, will be described with reference to FIGS. 10 to 15.

One clock cycle hereinafter used is defined to be the minimum time (cycle) during which the address data is processed on the bus, and is used to designate a processing limit capability of the arithmetic computing unit.

Figure 10:
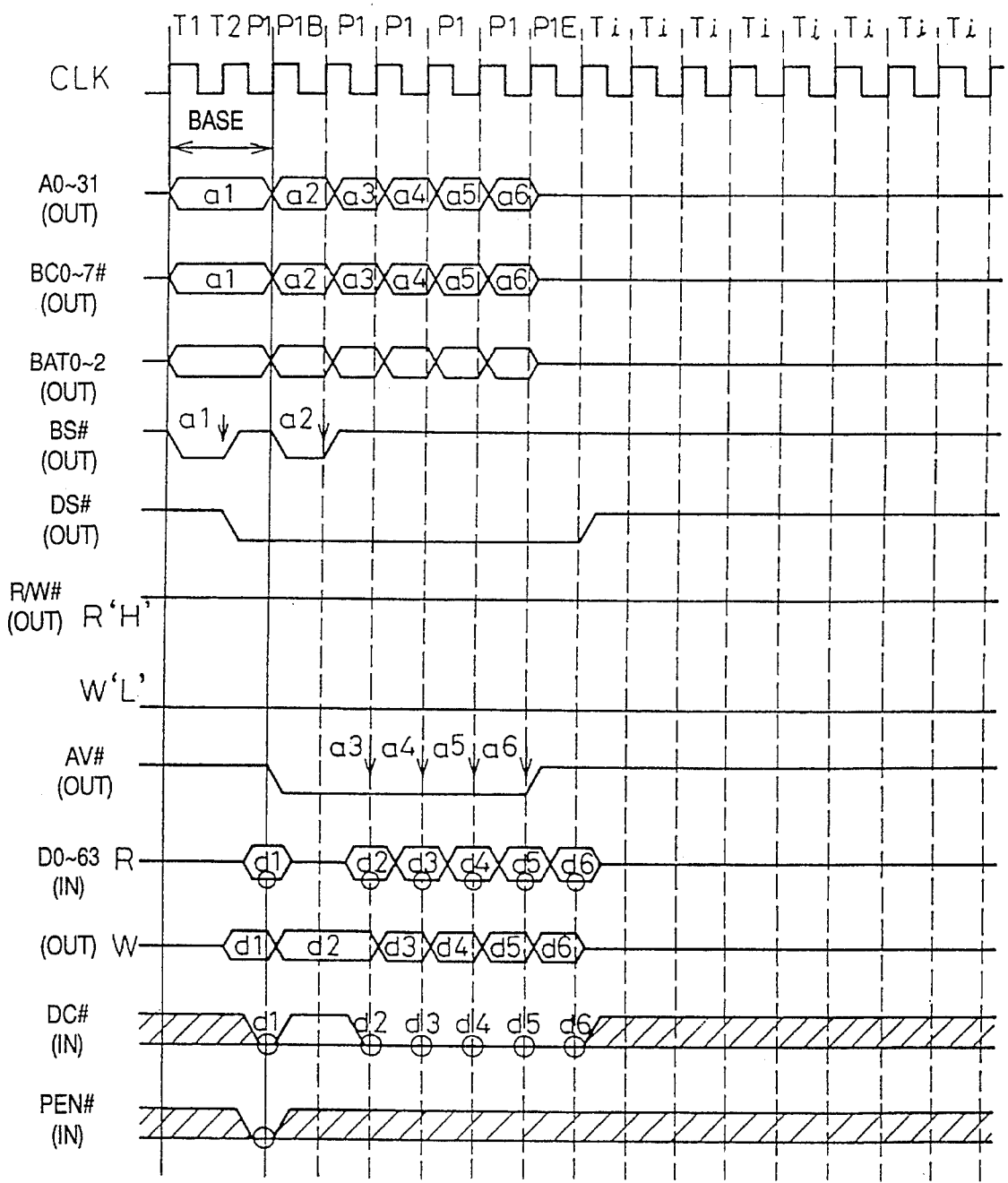
FIG. 10 is a bus timing chart without a wait in the pipe-line number 1.

FIG. 10 is a bus timing chart corresponding to FIG. 6, showing a read-write cycle of the physical pipe-line number=1 without a wait. In the drawing, A0 to 31, BC0 to 7# and BAT0 to 2 depict an address signal, a bus control signal and a bus access type signal respectively, BS# a bus start signal, DS# a data strobe signal, R/W# a read/write signal, AV# an address valid signal, D0 to 63 a data signal, DC# a data complete signal, and PEN# a pipe-line enable signal. Although a clock CLK is a two-clock basic cycle, the start of the pipe-line operation is detected by asserting the pipe-line enable signal PEN#, and in response to such detection the address valid signal AV# is asserted and concurrently the bus start signal BS# is asserted as much as the address first-out number (here, 1).

The address data a2, a3, ... during a pipe-line operation are latched at every clock basis in response to an address valid signal AV# and data complete signal DC# (d2, d3, ...). But, the address data a2 immediately after the start of the pipe-line operation is latched for one clock cycle using the bus start signal BS# instead of the data complete signal DC# because the data complete signal DC# is not returned. During the pipe-line operation, the address data is latched at a one clock unit without a wait to realize high speed access to the main memory.

Figure 11:
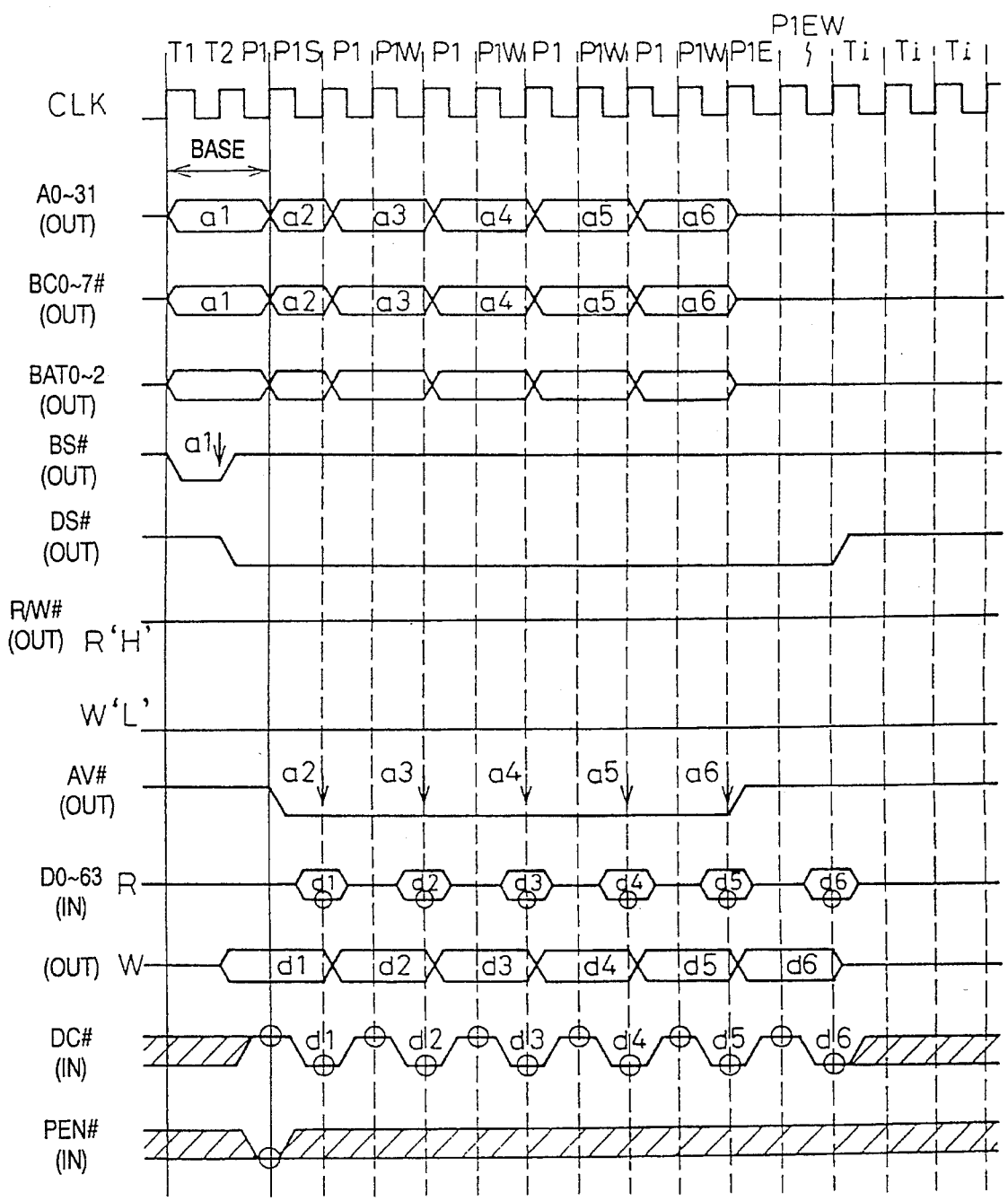
FIG. 11 is a bus timing chart with one wait in the pipe-line number 1.

FIG. 11 is a bus timing chart corresponding to the structure in FIG. 6, where a read-write cycle of the physical pipe-line number=1 is shown and the bus timing chart shows the data complete signal DC# generated with a delay time of one clock (cycle one wait). Although a clock CLK is a two-clock basic cycle, the start of the pipe-line operation is detected by asserting the pipe-line enable signal PEN#, and in response to such a detection, the address valid signal AV# is asserted but the bus start signal BS# is not asserted. The bus start signal BS# is not asserted because of one wait, output address a2 can be latched in response to the address valid signal AV# and the data complete signal DC#.

For the address data a2, a3 ..., the address data on and after a3 are latched at every second clock signal in response to the address valid signal AV# and the data complete signals DC# (d1, d2, ...).

Figure 12:
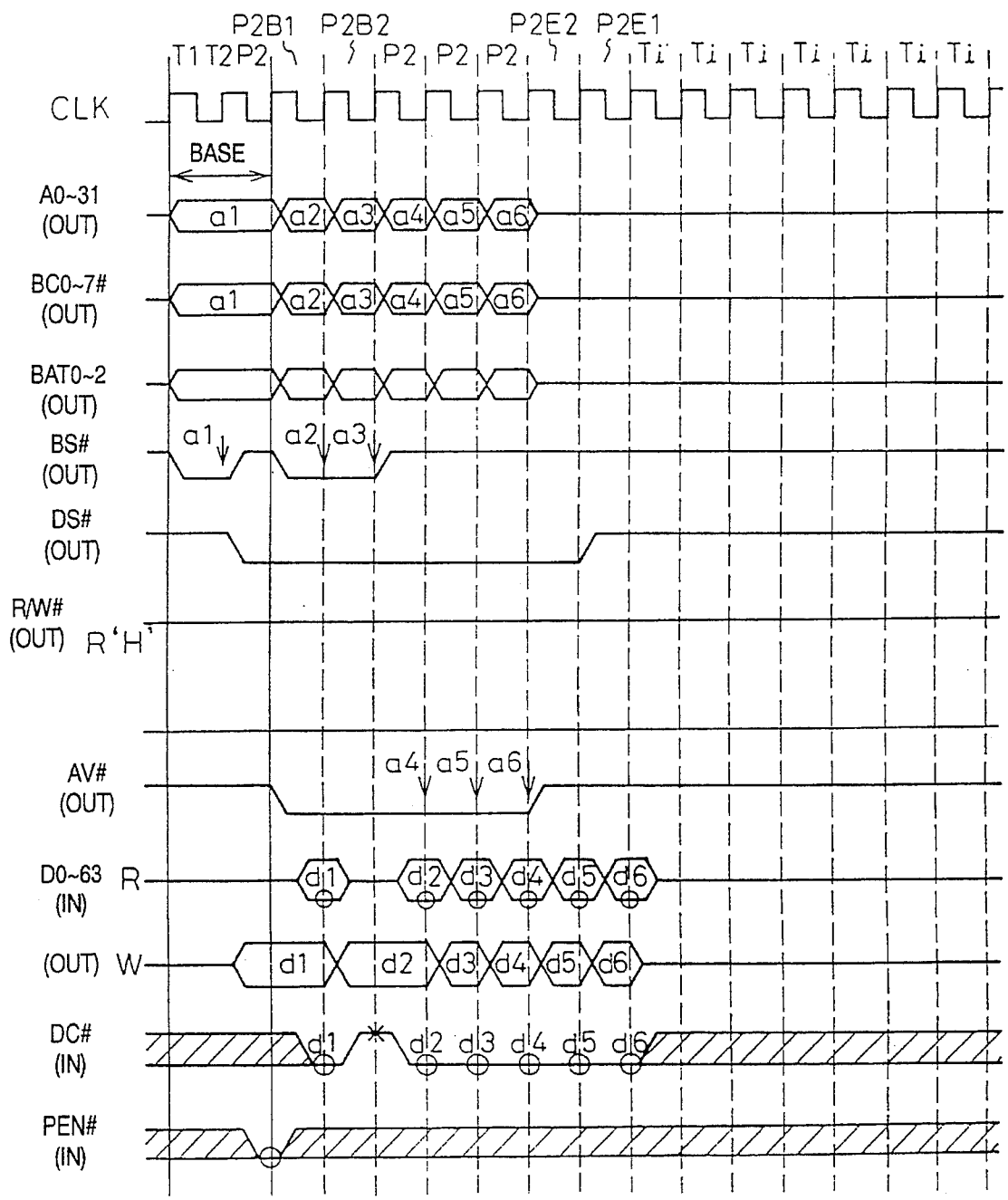
FIG. 12 is a bus timing chart without a wait in the pipe-line number 2.

FIG. 12 is a bus timing chart corresponding to the structure in FIG. 7, where a read-write cycle of the physical pipe-line number=2 without a wait is shown. When the pipe-line operation is started by asserting the pipe-line enable signal PEN#, the bus start signal BS# is asserted as long as two clock cycles immediately after the start. Two address data a2 and a3 during the pipe-line operation are latched at every clock in response to the bus start signal BS#, and the address data on and after a4 or the remaining address data a4, a5 and a6 are latched at every clock by the data complete signals (d2, d3 and d4). The bus start signal BS# is asserted as long as two clocks cycles because the data complete signal DC# does not return in the timing of latching the output address a3.

Figure 13:
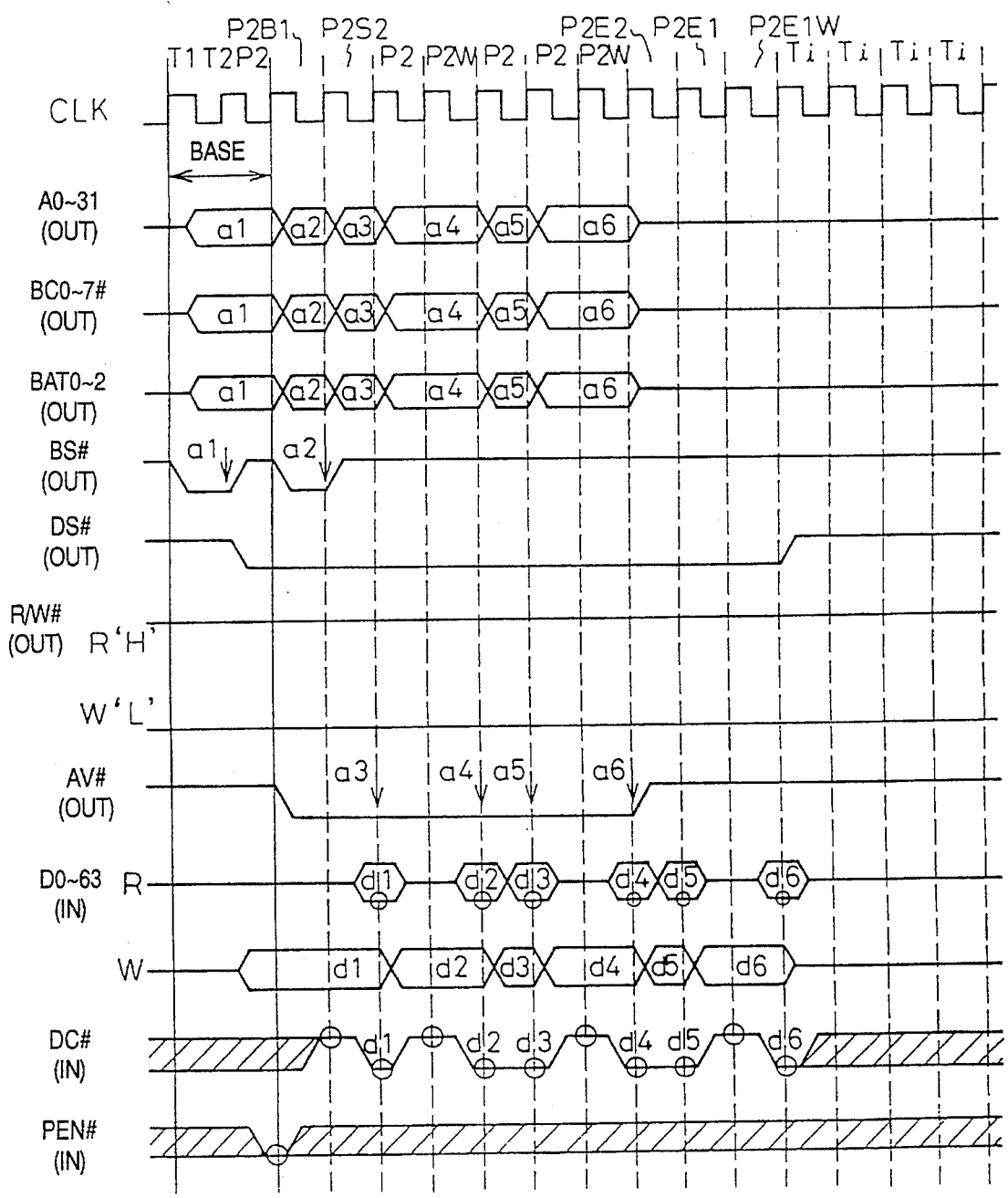
FIG. 13 is a bus timing chart with one wait in the pipe-line number 2.

FIG. 13 is a bus timing chart corresponding to the structure in FIG. 7, where a read-write cycle of the physical pipe-line number=2 is shown and the bus timing chart illustrates the data complete signal DC# generated with a delay time of one clock cycle (one wait). Although a clock CLK is a two-clock basic cycle, start of the pipe-line operation is detected by asserting the pipe-line enable signal PEN#, and in response to such a detection the address valid signal AV# is asserted and concurrently the bus start signal BS# is asserted for the duration of the address first-out number (here, 1).

The address data a2, immediately after the pipe-line operation, is latched for one clock cycle by the bus start signal BS# instead of the data complete signal DC# because the data complete signal DC# is not returned. The address data a3 and a5 are latched at every clock cycle in response to the address valid signal AV# and the data complete signals DC# (d1, d3), and the address data a4 and a6 are latched at every second clock cycle in response to the address valid signal AV# and the data complete signals DC# (d2, d4).

Figure 14:
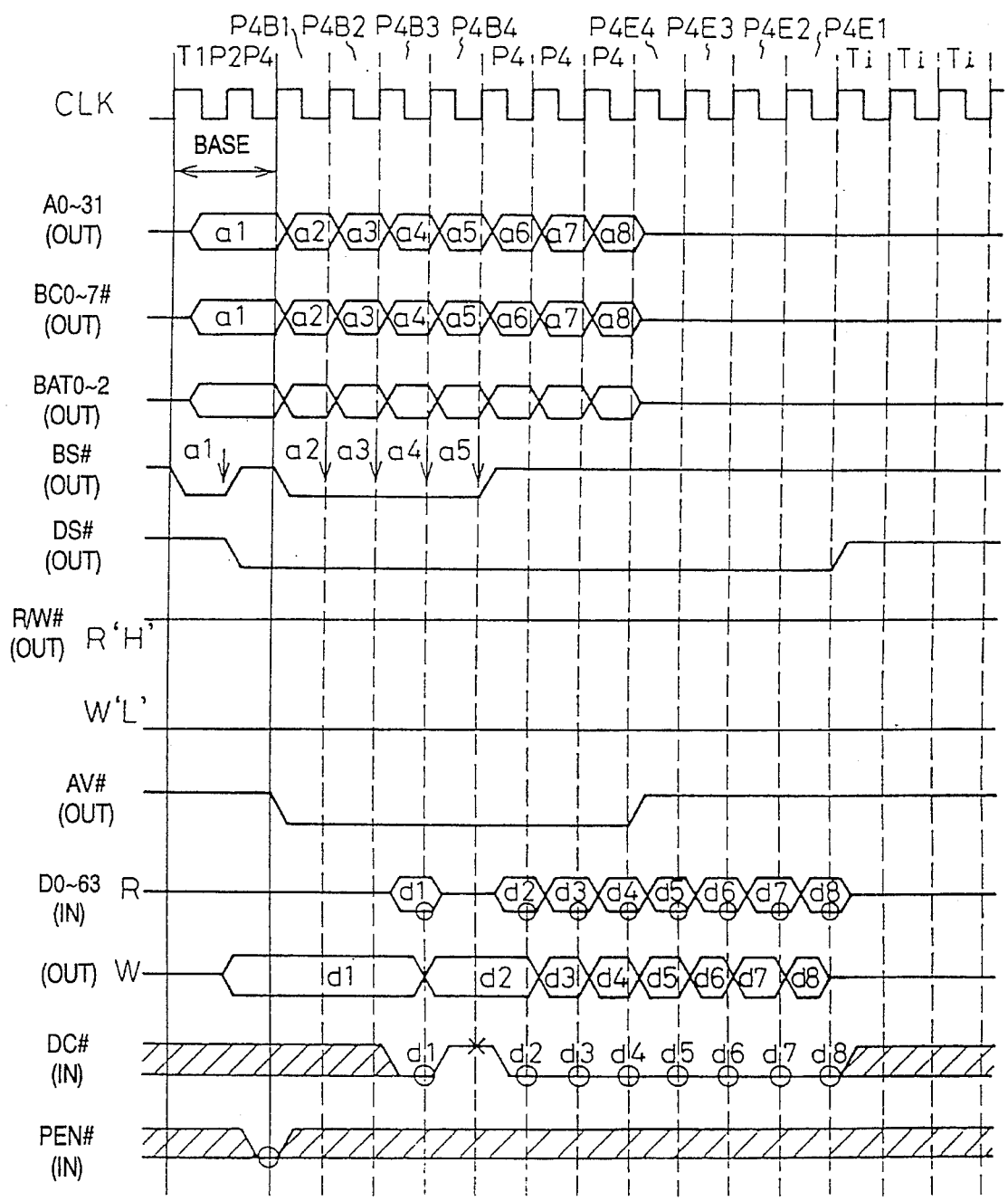
FIG. 14 is a bus timing chart without a wait in the pipe-line number 4.

FIG. 14 is an example of the physical pipe-line number=4. The address data a2 to a5 are latched at every clock cycle in response to the bus start signal BS#, which is asserted as long as four clocks cycles immediately after the start of the pipe-line operation, and the remaining address data a6 to a8 are latched at every clock cycle in response to by the data complete signals DC# (d2 to d4). The bus start signal BS# is latched as long as four clocks cycles because the data complete signal DC# does not return at the timing of latching the output address a5.

Figure 15:
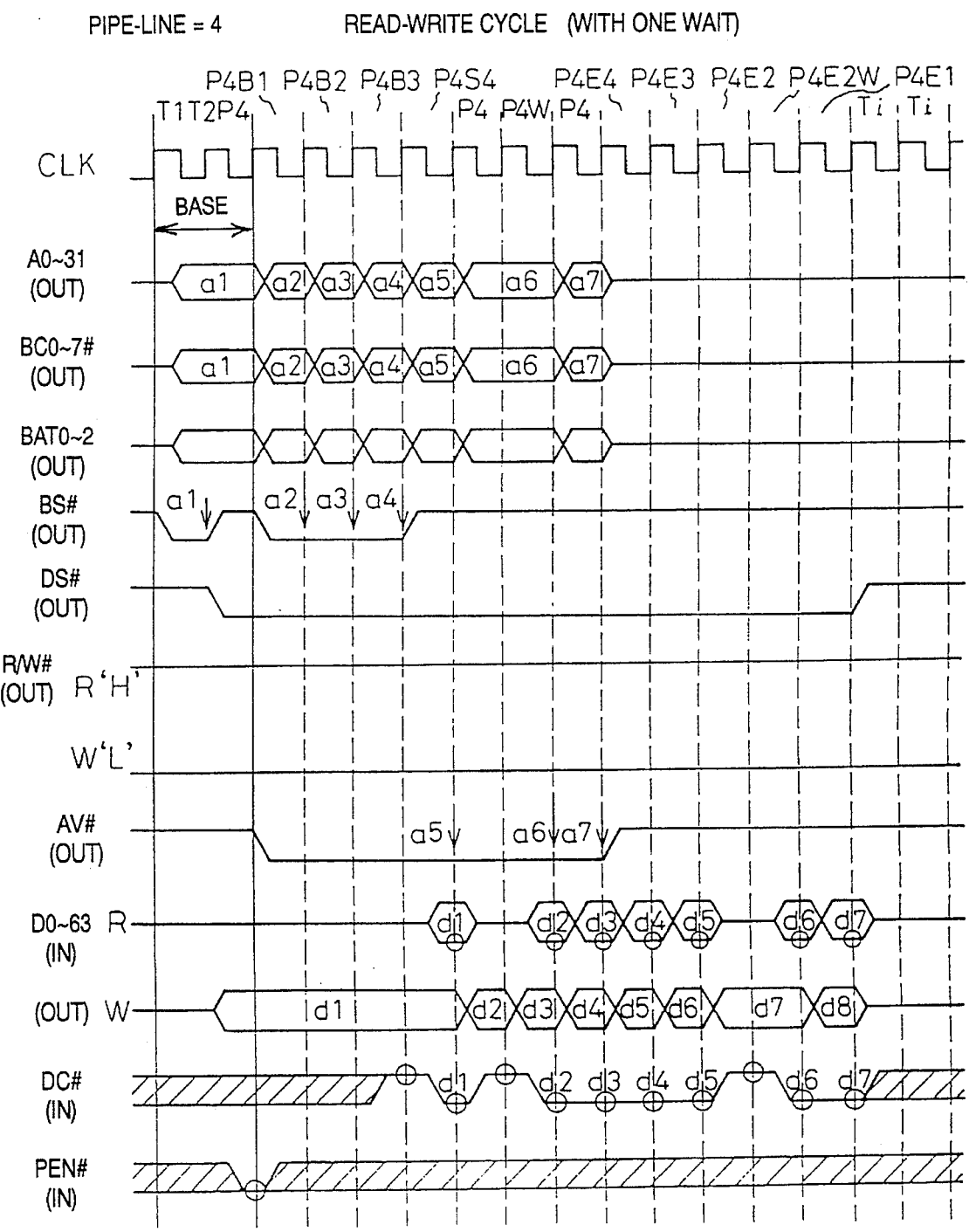
FIG. 15 is a bus timing chart with one wait in the pipe-line number 4.

FIG. 15 is a bus timing chart of the physical pipe-line number=4 with one wait. The address data a2 to a5 and a7 other than the address data a6 are latched at every clock cycle. The output address a5 can be latched in response to the data complete signal DC# and the address valid signal AV#, and the bus start signal BS# is not output.

For simplifying the explanation, the physical pipe-line numbers were 1, 2 and 4 in the foregoing, but it is possible to increase the physical pipe-line number. According to the invention, a transition from the basic cycle to the pipe-line cycle can be performed in response to the start of the pipe-line operation to ensure applicability in general use between the microprocessors having the different basic cycles. The address data is latched response to the address valid signal AV# and the data complete signal DC# that designates the entrance to the pipe-line cycle, enabling a one-clock cycle operation with a higher access speed of the main memory. The logical pipe-line depending number, which depends on the bank number and the address stride, can be set to prevent deterioration of bus efficiency.

Next, the embodiments of the memory access device using the pipe-line processing for realizing a method of memory access according to the invention will be described as follows.

FIRST EMBODIMENT

FIGS. 16 to 24 are views of the first embodiment of the memory access device according to the invention, where the bank number is 1.

Figure 16:
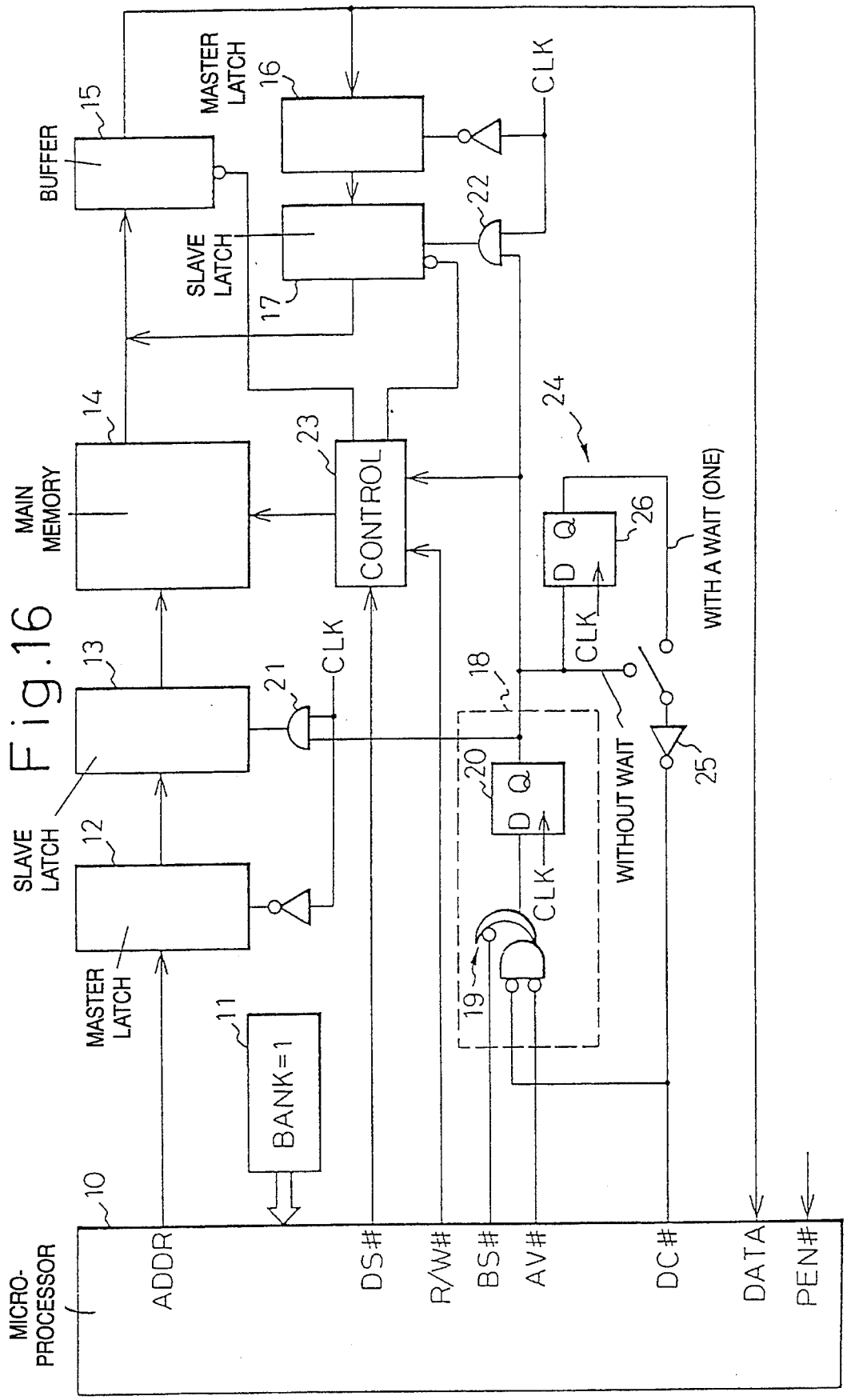
FIG. 16 is a block diagram of a first embodiment of a memory access device according to the invention.

In FIG. 16, numeral 10 depicts a microprocessor. The microprocessor 10 having functions such as pipe-line operation detection, and control signal generation. The microprocessor generates an address data ADDR to execute a predetermined arithmetic operation by outputting the data DATA corresponding to the ADDR on a data bus in a write cycle or by taking in the same from the data bus in a read cycle. The microprocessor 10 can be informed of the bank number (in this example, 1) from an external source, and is provided with, for example, a signal terminal 11 (register is also available) for information of the bank number.

From among various control signals inputting in or outputting from the microprocessor 10, DS# is a data strobe signal for displaying termination of the pipe-line bus operation, R/W# is a read-write display signal for displaying a read cycle or write cycle, BS# is a bus start signal for maintaining the asserting condition of the clock number corresponding to the first-out number of the pipe-line immediately after the start of the pipe-line operation, AV# is an address valid signal for displaying the enter to the pipe-line and the assertion of the pipe-line address, and DC# is a data complete signal for indicating the completion of data read from the main memory or data write to the main memory, and PEN# is a pipe-line enable signal.

The address data ADDR from the microprocessor 10 is taken into a main memory 14 through a master latch 12 and a slave latch 13. The data DATA from the main memory 14 is taken into the microprocessor 10 through a buffer 15, or the data DATA from the microprocessor 10 is brought into the main memory 14 through a master latch 16 and a slave latch 17.

A latch circuit 18 functions as a latch signal generator and a divider. When the address valid signal AV# and data complete signal DC# are negative logic or the bus start signal BS# is negative logic, the latch circuit 18 is provided with multiple logic gates 19 for generating a positive logic output, and a flip-flop 20 for synchronizing the positive logic output with a clock signal CLK. A Q-output of the flip-flop 20 becomes a latch signal to be fed to the slave latches 13 and 17 through AND gates 21 and 22 is and concurrently fed to a control circuit 23 for determining the operational timing of the main memory 14.

Numeral 24 depicts a circuit (indicating signal generating circuit) for generating the data complete signal DC#. The circuit 24 sends the signal generated at the latch circuit 18 to the microprocessor 10 through an inverter gate 25 under the condition without wait, and on the other hand sends the same but after giving a one clock delay by a flip-flop 26 to the microprocessor 10 through an inverter gate 25 under the condition with one wait. The data complete signal DC# for indirectly indicating the completion of the access of the main memory 14 is produced by applying a delay depending on the presence of a wait to the signal generated at the latch circuit 18 depending on the response speed of the main memory. If it is possible to take out the signal corresponding to the data complete signal DC# from the main memory 14, the signal may preferably be fed directly to the microprocessor 10.

Figure 17:
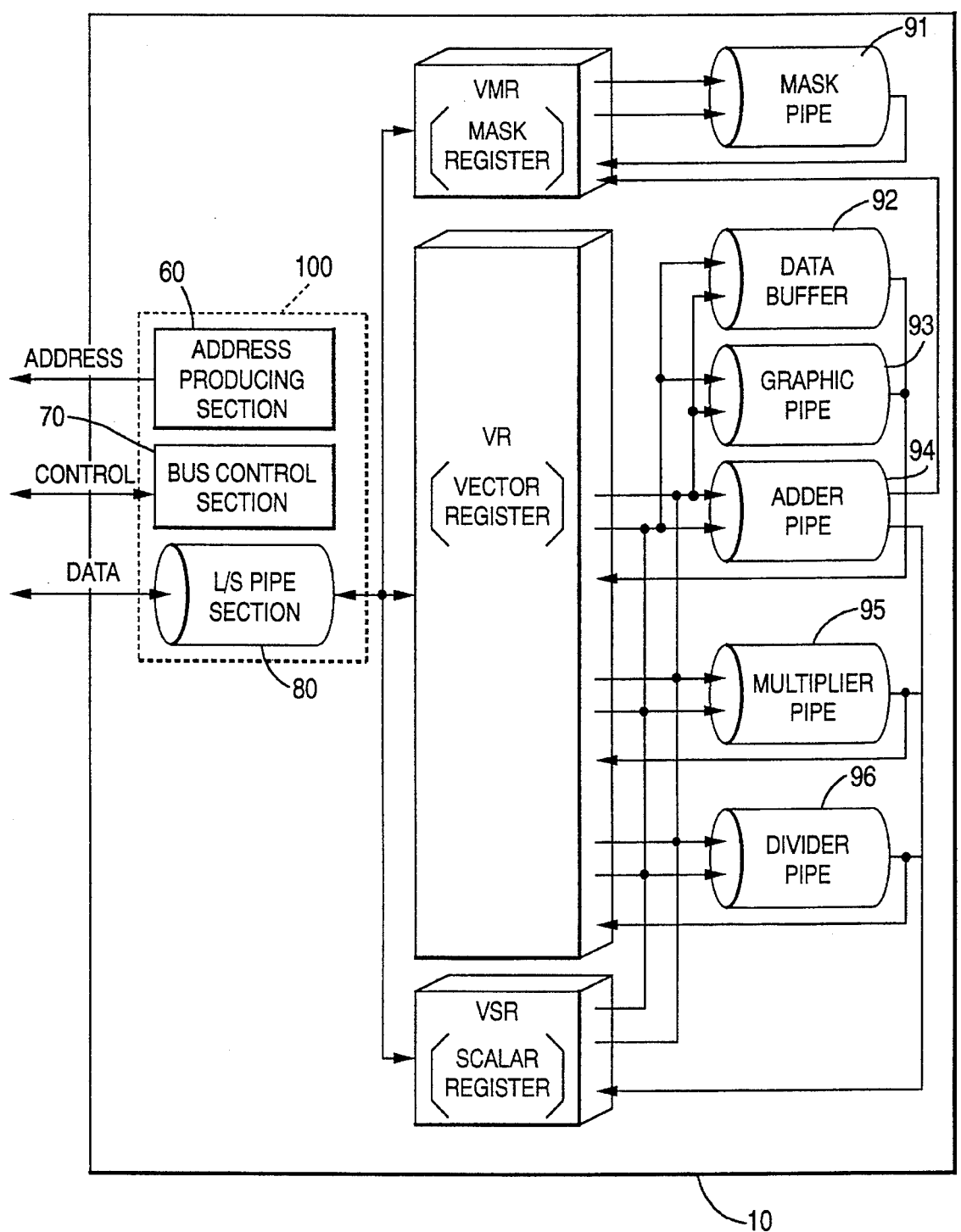
FIG. 17 is a block diagram of an example of the microprocessor in FIG. 16.

FIG. 17 is a block diagram of an example of the microprocessor 10 of FIG. 16. In the microprocessor 10 there are provided: a memory access control section 100 (including an address producing section 60 for producing the data address, a bus control section 70 for controlling the bus, and an L/S pipe section 80 for processing load/store of the data, a mask register VMR for temporarily storing the data), a mask register VMR, for temporarily storing the data, a vector register VR, a scalar register VSR, a mask pipe 91, a data buffer 92, a graphic pipe 93, an adder pipe (adder) 94, a multiplier pipe (multiplier) 95, and a divider pipe (divider) 96. The mask pipe 91, the data buffer 92, the graphic pipe 93, the adder pipe (adder) 94, the multiplier pipe (multiplier) 95, and the divider pipe 96 are all connected, either directly or indirectly, to the mask register VMR, the vector register VR, and the scalar register VSR.

Figure 18:
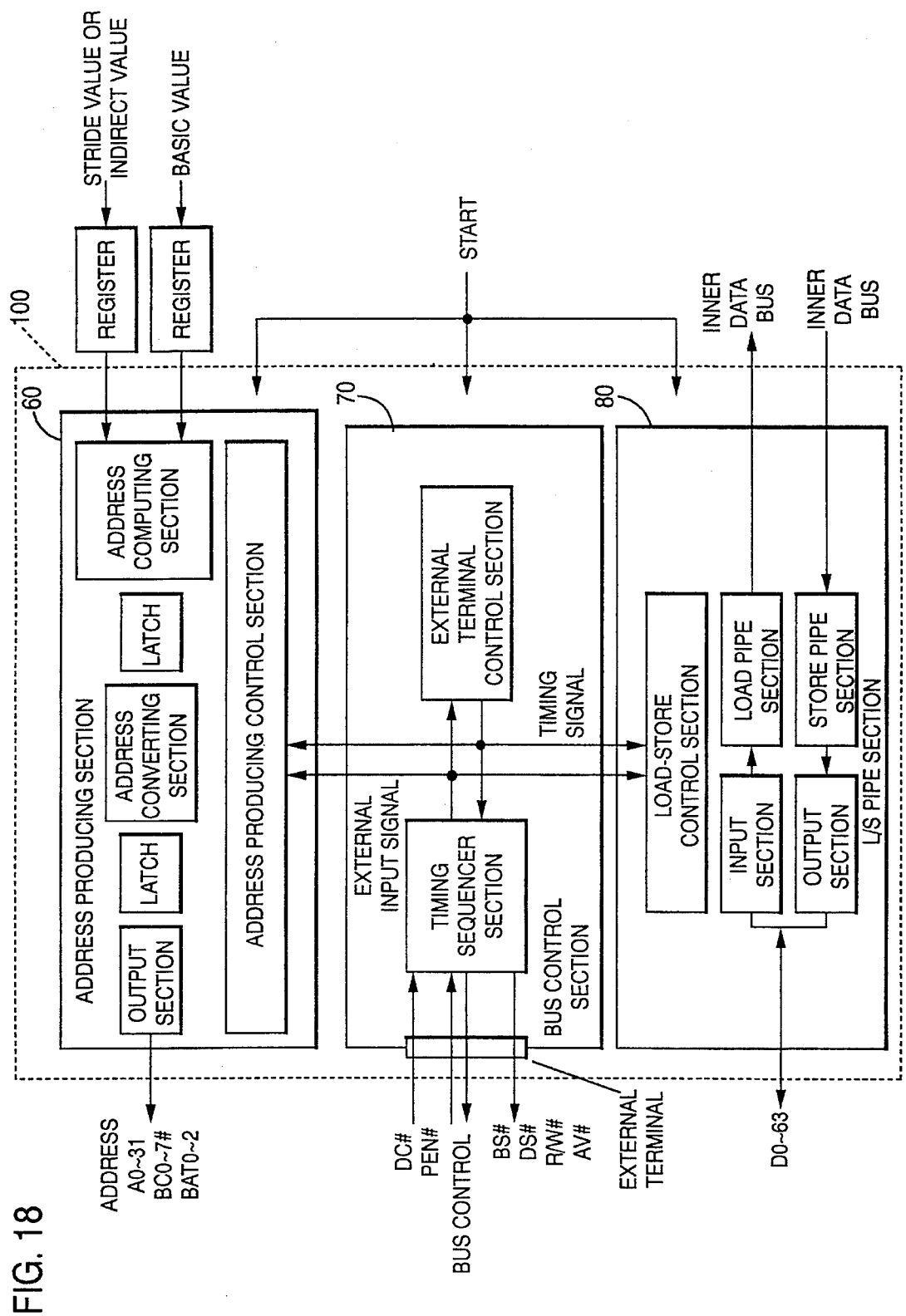
FIG. 18 is a block diagram of an example of the memory access control section in FIG. 17.

FIG. 18 is a block diagram of the memory control 100 in FIG. 17. The address producing section 60 includes an address computing section, a latch, an address converting section, an address producing control section, and an output section. The bus control section 70 includes an external terminal control section, a timing sequencer section and an external terminal. The L/S pipe section 80 includes a load-store control section, an input section, a load pipe section, a store pipe section and an output section. The stride value (or indirect value) and basis value for producing the address stored in the register, as described regarding FIG. 17, are input to the address computing section of the address producing section 60, and the inner processed data are output from the output section as the address signals A0 to 31, bus control signals BC0 to 7# and bus access type signals BAT0 to 2. The address producing control section, timing sequencer section, external terminal control section and load-store control section are connected to each other as shown in the drawing to be supplied with the external input signals and timing signals as shown in the drawing. The data complete signal DC#, pipe-line enable signal PEN# and bus control signal are input to the timing sequencer section through the external terminal, and the bus control signal, bus start signal BS#, data strobe signal DS#, read/write display signal R/W# and address valid signal AV# are output. The load pipe section of the L/S pipe section 80 is for reading the data. The store pipe section is for outputting the data to memory, and both pipes are connected with an inner data bus that is connected to the mask register VMR, vector register VR and scalar register VSR in FIG. 17. The data D0 to 63 are input to the input section and output from the output section.

Figure 19:
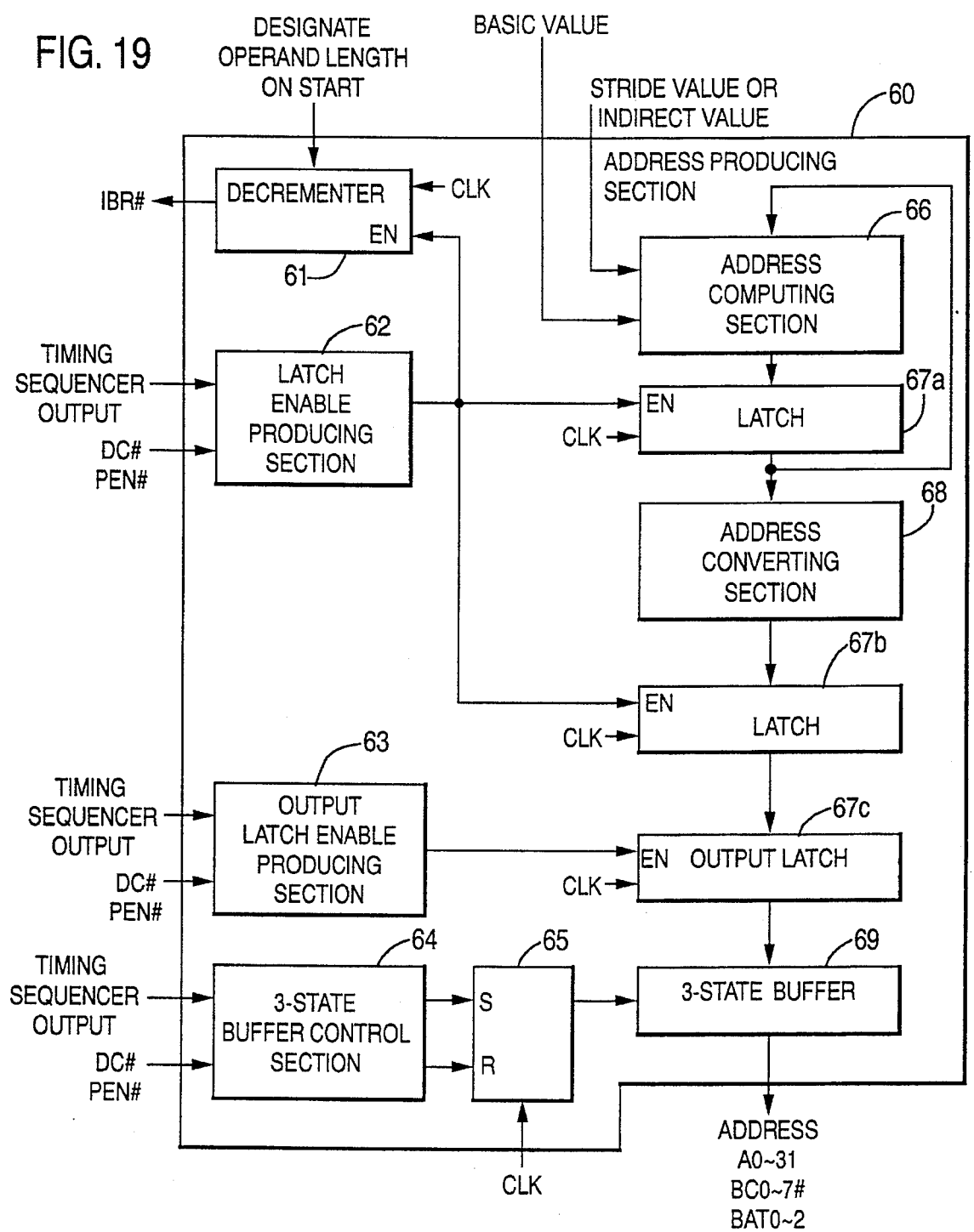
FIG. 19 is a block diagram of an example of the address producing section in FIG. 18.

FIG. 19 is a block diagram of an example of the address producing section 60 in FIG. 18. On starting, an operand length is designated for a decrementer 61, from which an inner bus request signal IBR# is output. The timing sequencer output, data complete signal DC# and pipe-line enable signal PEN# are respectively input to a latch enable producing section 62, an output latch enable producing section 63 and three-state buffer control section 64. The address computing section 66, the latches 67a and 67b and the address converting section 68 are connected as shown in the drawing, and the output latch 67c and a three-state buffer 69 corresponds to the output section in FIG. 18. The signal from a latch enable producing section 62 is supplied to the decrementer 61 and latches 67a and 67b; the signal from an output latch enable producing section 63 is input to an output latch 67c, and the signal from a three-state buffer control section 64 is input to a three-state buffer 69 through a flip-flop 65. The three-state buffer 69 outputs the address signals A0 to 31 designating the data address, the bus control signals BC0 to 7# and the bus access type signals BAT0 to 2.

Figure 20:
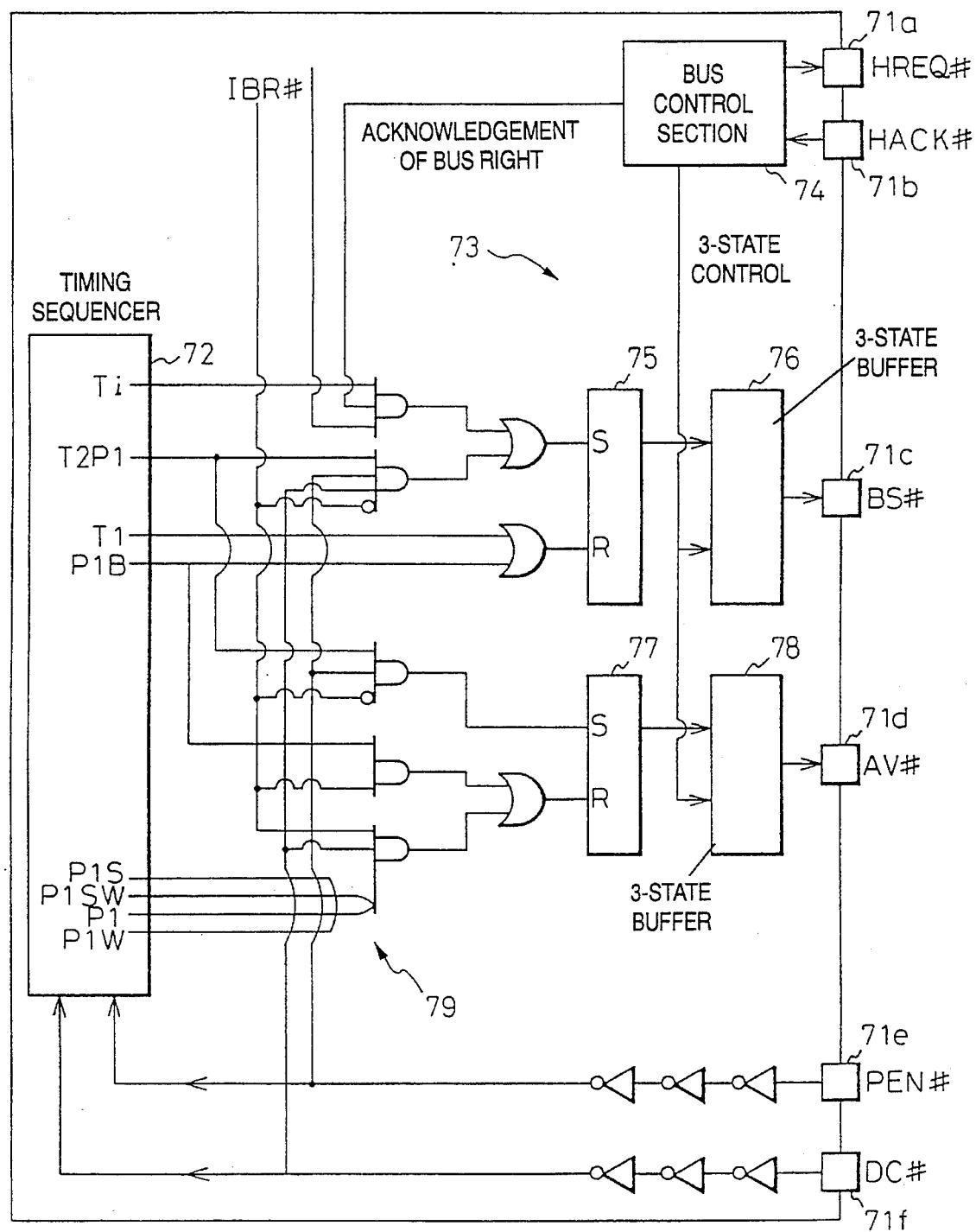
FIG. 20 is a block diagram of an example of the bus control section in FIG. 18.

FIG. 20 is a block diagram of an example of the bus control section 70 in FIG. 18. In the drawing, numerals 71a to 71f depict external terminals, and 72 a timing sequencer. Numeral 73 depicts an external terminal control section that includes a bus control section 74, flip-flops 75 and 77, and three-state buffers 76 and 78, and the external terminal control section is connected by a bus line 79 as shown in FIG. 20. A hold request signal HREQ# for acknowledging a bus right is output from the external terminal 71a; a hold acknowledge signal HACK# designating an acknowledgement of input of the bus right is input to the external terminal 71. The pipe-line enable signal PEN# and the data complete signal DC# input to external terminals 71e and 71f enter the bus line concurrently, and are input to the timing sequencer 72. The signals of symbols as shown in the timing sequencer 72 are coincident with the symbols attached to the clock CLK in FIGS. 10 and 11.

Figure 21:
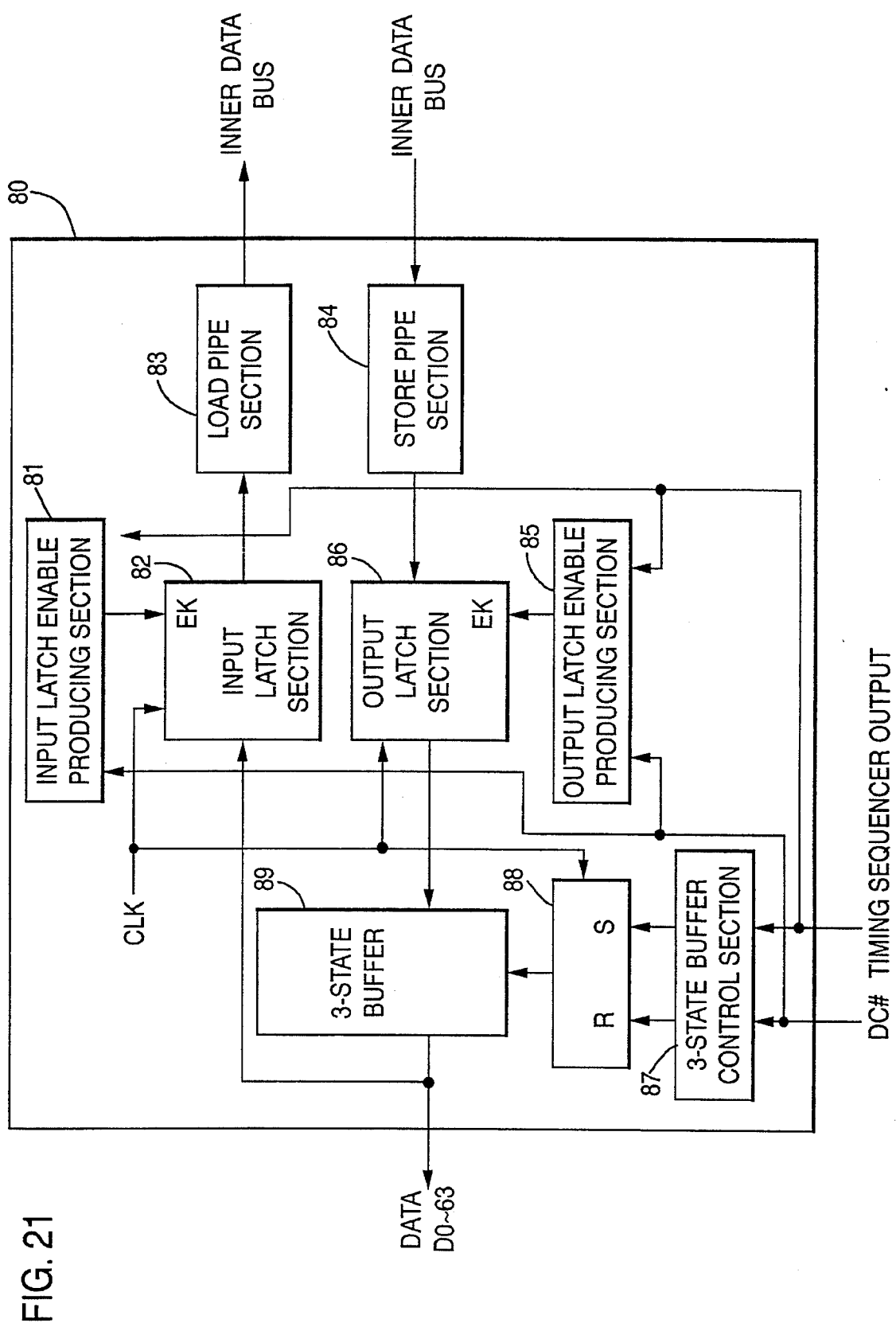
FIG. 21 is a block diagram of an example of the L/S pipe section In FIG. 18.

FIG. 21 is a block diagram of an example of the L/S pipe section 80 in FIG. 18. The inputted data D0 to 63 are input to a load pipe section 83 through an input latch section 82 that is controlled by an input latch enable producing section 81 and are output to the inner data bus of the microprocessor 10. The data input from the inner data bus is stored through a store pipe section 84 into an output latch section 86, which is controlled by the output latch enable producing section 85, and then is output from a three-state buffer 89, which is controlled by a three-state buffer control section 87 and a flip-flop 88. The clock signal CLK is input to the input latch section 82, output latch section 86 and flip-flop 88 to perform a synchronization of operation. The data complete signal DC# and timing sequencer output are input to the input latch section 82, output latch section 86 and three-state buffer 89.

Figure 22:
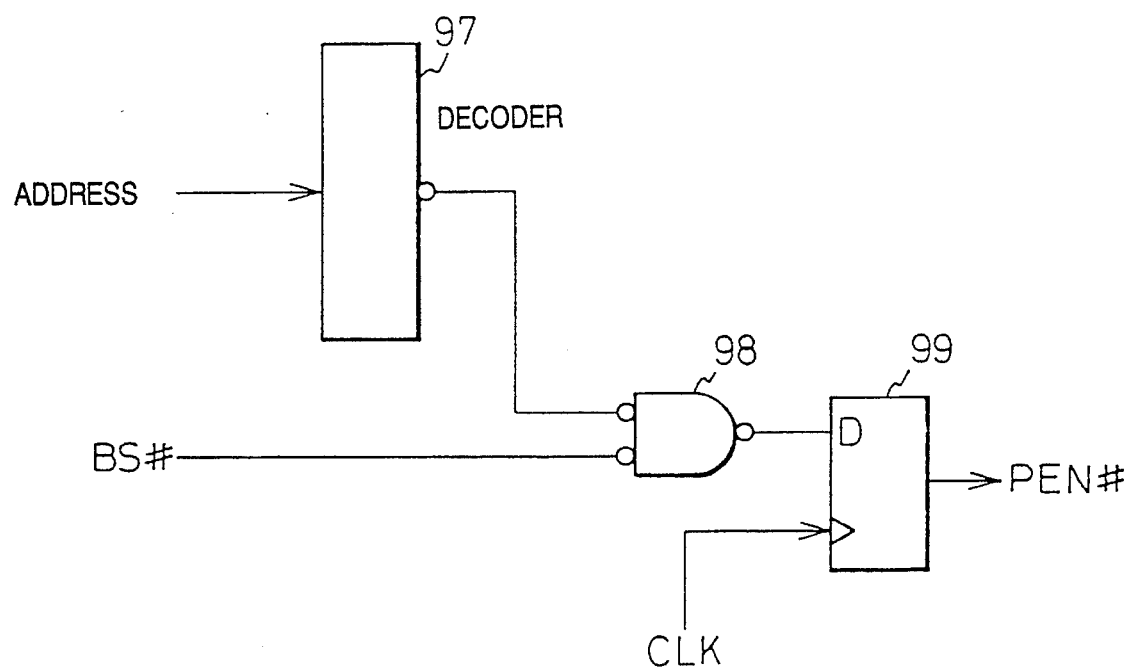
FIG. 22 is a circuit diagram of example for producing a pipe-line enable signal, FIG. 23 (FIGS. 23A and 23B) is a conceptual view showing operation of a timing sequencer.

FIG. 22 is a circuit diagram of an example for producing the pipe-line enable signal PEN#. The pipe-line enable signal PEN# may preferably be asserted when detecting the address of the main memory capable of a pipe-line operation, and can be obtained by the process that a logical sum of the signal inverted after the address signal of the main memory is decoded by the decoder and a bus start signal BS# is produced by an NAND circuit 98 of an inverse input and then the logic sum is passed through a flip-flop 99. The pipe-line enable signal PEN# is asserted upon starting the pipe-line operation as shown in FIGS. 10 to 15.

FIGS. 23A and 23B are conceptual views of the timing sequencer 72 in FIG. 20. In the drawings, symbol ○ designates an assert, ● a negate, and a □ a latch. The portion shown by symbol M is achieved by a circuit as shown by symbol N, and the portion shown by symbol P is achieved by a circuit as shown by symbol Q.

For an explanation of a part of the operation described above, a start signal is asserted at a latch Ti to obtain the bus right, then the control proceeds from a latch T1 to a latch T2P1. Here, the data complete signal DC# and the inner bus request signal IBR# are asserted, and return to the latch T1 when the pipe-line enable signal PEN# is the negate. When the data complete signal DC#, inner bus request signal IBR# and pipe-line enable signal PEN# are all asserted, the control proceeds to a latch P1B, and when the data complete signal DC# is the negate and the inner bus request signal IBR# and pipe-line enable signal PEN# are asserted, then the control proceeds to a latch P1S. In the latch P1S, when the data complete signal DC# is the negate, the control proceeds to a latch P1SW to enter a wait, and when the data complete signal DC# and inner bus request signal IBR# are asserted, the control is to proceed to a latch P1. The operation of this conceptual view corresponds to symbols attached on the clock signal CLK, as shown FIGS. 10 and 11.

In the memory access device as described above, the bus timing is as shown FIG. 24. The address data a1 immediately after the start of the pipe-line operation is determined by a timing of the master latch clock in an assert condition of the bus start signal BS# (see symbol A), the next address data a2 is determined by a timing of the master latch clock in an assert condition both of the address valid signal AV# and data complete signal DC# (see symbol B). Therefore, the main memory 14 is accessed at every clock at high speed.

Figure 25:
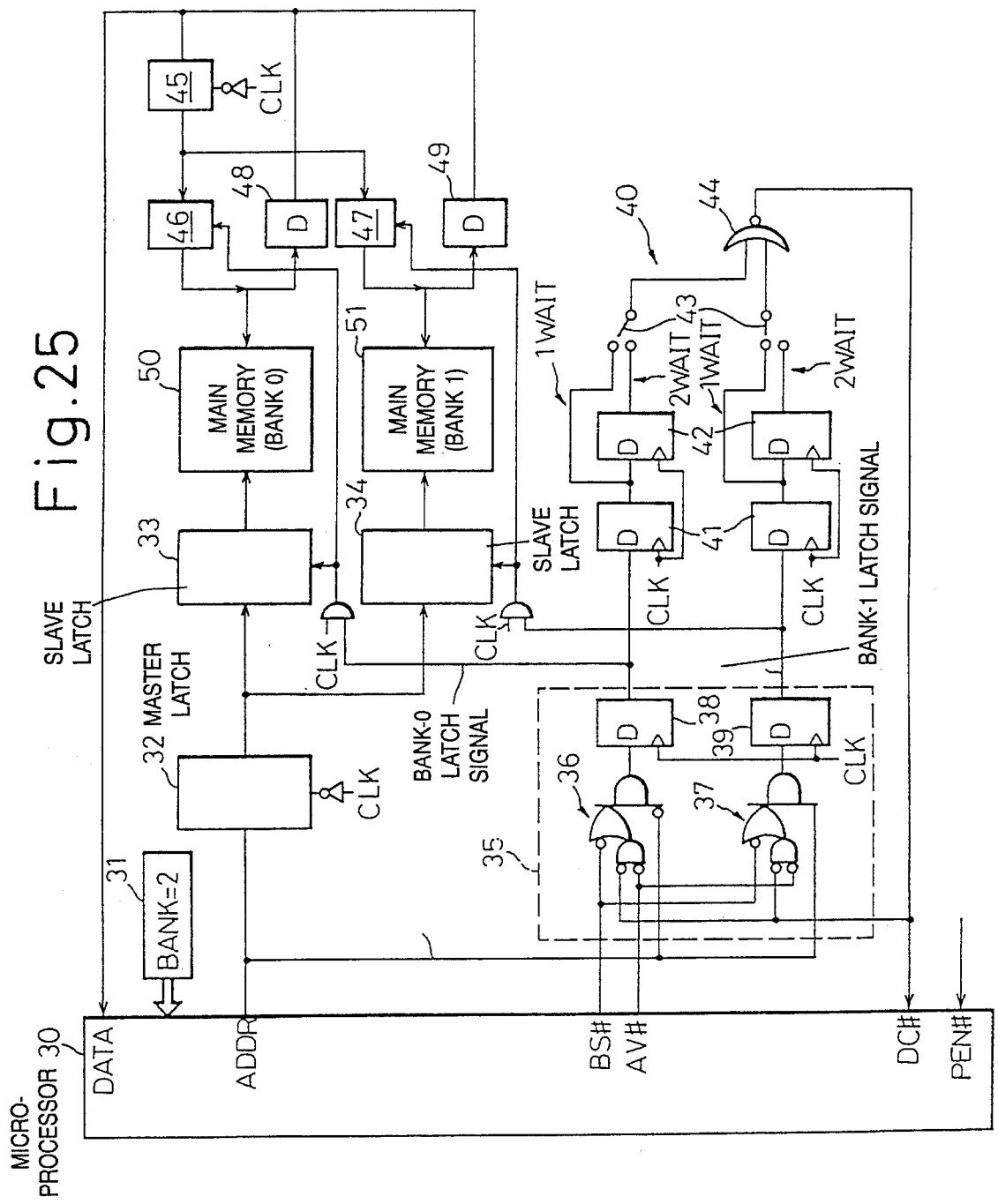
FIG. 25 is a circuit diagram of a second embodiment of a memory access device of the invention.
Figure 26:
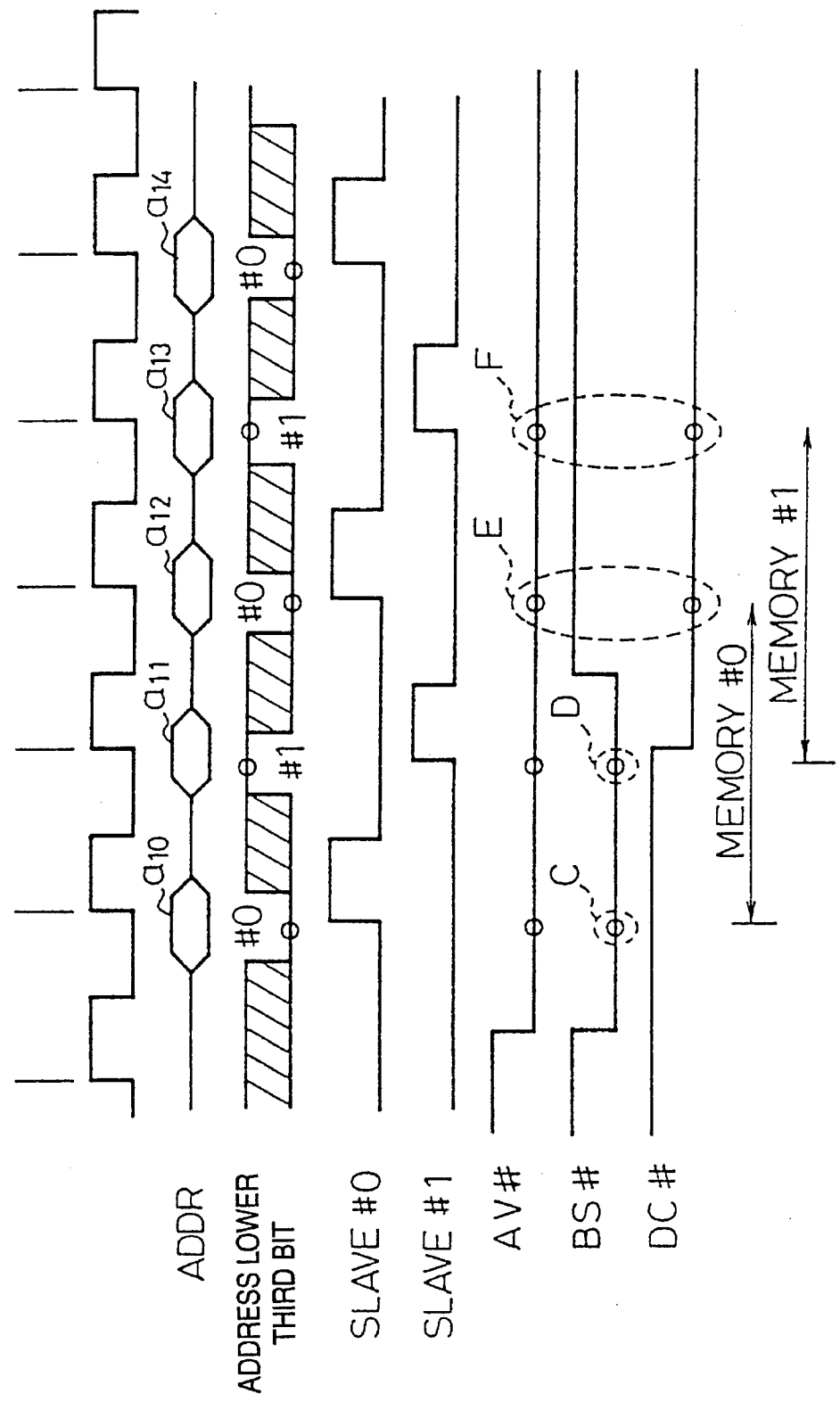
FIG. 26 is a bus timing chart of the device in FIG. 25.

FIGS. 25 and 26 show the second embodiment of a memory access device according to the invention, where the bank number is 2. The embodiment includes a main memory 50 at the bank 0 side and a main memory 51 at the bank 1 side.

In FIG. 25, numeral 30 depicts a microprocessor, 31 depicts input informing the microprocessor 30 of the bank number, for example, an input terminal. An address data ADDR from the microprocessor 30 is taken and fed to either of the slave latches 33 or 34 through a master latch 32. The two slave latches 33 and 34, each correspond to the bank number, receive respectively a bank-0 latch signal and a bank-1 latch signal from a latch signal generating circuit 35. When the address valid signal AV# and data complete signal DC# both are negative logic or when the bus start signal BS# is negative logic, and when the address data ADDR is a 64-bit data bus, the multiple logic circuits 36 and 37 of the latch signal generating circuit 35 outputs positive logic thereof depending on the logic of the lower fourth bit of the address data ADDR. Flip-flops 38 and 39 synchronize the abovementioned positive logic with a clock signal CLK. The latch signal generating circuit 35 determines the output of the multiple logic circuit 36 at the bank 0 side to be "true" when the lower fourth bit of an address data ADDR is negative logic, and determines the output of the multiple logic circuit 37 at the bank 1 side to be "true" when the lower third bit of an address data ADDR is positive logic.

When the address data ADDR designates bank 0, if the address valid signal AV# and data complete signal DC# are negative logic or the bus start signal BS# is negative logic, then the main memory 50 at the bank 0 side is accessed by taking the address data ADDR into the slave latch 33 at the bank 0 side. When the address data ADDR designates bank 1, if the address valid signal AV# and data complete signal DC# are negative logic or the bus start signal BS# is negative logic, then the main memory 51 at the bank 1 side is accessed by taking the address data ADDR into the slave latch 34 at the bank 1 side.

Numeral 40 depicts a circuit for generating the data complete signal DC#, which provides two circuits, one for bank 0 and another for bank 1. Each circuit is comprised of flip-flops 41 and 42, and switch 43, which can be turned and interlocked, depending on the wait number (one or two). For example, the latch signal for the bank 0 side or the latch signal for the bank 1 side is delayed by one clock cycle (or two clock cycles) and is input to the microprocessor 30 through an NOR gate 44. Numeral 45 depicts a master latch for data, 46 and 47 slave latches for data, and 48 and 49 buffers for data.

According to the structure described above, the bus timing is as shown in FIG. 26. The address data a10 and a11, immediately after the start of a pipe-line operation, are determined by a timing of the master latch clock under the asserting condition of the bus start signal BS# (see symbols C and D), and taken sequentially into the slave latches at the bank 0 side shown by #0 and at the bank 1 side shown by #1, depending on the logic state of the then lower fourth bit of the address. At the same time, the succeeding address data a12, a13, ... are determined by the timing of the master latch clock under the asserting condition of the address valid signal AV# and data complete signal DC# (see symbols E and F), and are taken sequentially into the slave latches at the bank 0 (#0) side and at the bank 1 (#1) side, depending on the logic state of the then lower fourth bit of the address.

Thus, the main memory 50 at the bank 0 side and the main memory 51 at the bank 1 side are accessed at every clock cycle to be operated at a higher speed.

As hereinbefore described, according to the embodiments, a transition can be executed from the basic cycle to the pipe-line cycle in response to the start of the pipe-line operation, thus ensuring a general applicability between the microprocessors having different basic cycles.

The address data can be latched in response to the address valid signal AV# and data complete signal DC# both indicating the entry to the pipe-line cycle and the establishment of the address to enable a one clock cycle operation for producing a high speed process of the main memory.

The logical pipe-line, which depends on the bank number and address stride value, can be set to prevent the deterioration of bus efficiency.

The embodiments hereinbefore described employs two kinds of bank numbers "1" and "2". Nevertheless, the present invention is not limited to the numbers described. When the bank number is required to increase in the embodiments, the latch signal circuit and the data complete signal DC# generating circuit may be multiplexed in their structures, depending on the bank number.

As hereinbefore fully described, in accordance with the present invention, immediately after the start of the pipe-line operation there is generated a control signal that continues as long as the cycle number corresponding to at least the address first-out number of a pipe-line; concurrently the display signal for displaying the completion of the data access is produced, and the address latch signals are routed to respective banks by generating the address latch signal in synchronization with the clock signal during the time that either the control signal or display signal is generating, thus an access speed of the main memory is greatly improved ensuring applicability in general use.

What is claimed is:

1. A microprocessor coupled to, and accessing, a main memory comprising banks and transmitting a completion signal designating completion of main memory access, said microprocessor comprising:

data processing means for processing data;

decision means for determining whether the main memory access is one of a normal access mode and an address-data-pipeline access mode; and address generating means for outputting a bus start signal designating a start of said address-data-pipeline access mode, for receiving a bank number equal to a number of the banks, and for generating an address for accessing the main memory, said address having a width defining a stride value, said address comprising a preset number of address components, said preset number determined by said bank number and said stride value, and said address generating means executes a first-out operation if the main memory access is the address-data-pipeline access mode, wherein said address generating means renews the address in a shorter period if the main memory access is the address-data-pipeline access mode than if the main memory access is the normal access mode, and said address generating means stops renewing said address after the first-out operation but before said microprocessor receives the completion signal if the main memory access is the address-data-pipeline access mode.

2. A microprocessor as claimed in claim 1, further comprising output means for outputting externally of the microprocessor a signal that indicates a transition to said address-data-pipeline access mode.

3. A microprocessor claimed in claim 1, wherein said data processing means processes vector data.

4. A memory access device coupled to a clock generating a clock signal, said memory access device executing data access, including a pipe-line operation, from a bank of main memory and comprising:

pipeline operation detection means for detecting a start of said pipe-line operation;

control signal generating means for generating a control signal that is active for a number of cycles equal to an address first-out number of a pipeline, which is active immediately after the start of said pipe-line operation, remains active;

indicating signal generating means for generating a completion signal that indicates the completion of said data access for said bank;

latch signal generating means for generating an address latch signal in synchronization with the clock signal during a time that one of said control signal and said completion signal is generated; and dividing means for routing said address latch signal to respective banks.

5. A memory access device as claimed in claim 4, wherein said dividing means routes said address latch signal based on contents of the address data.

6. A data processing system, having a clock generating and transmitting clock pulses according to clock cycles, generating addresses, including an address first-out, accessing an address space of a main memory, the address space being partitioned equally into blocks, each block corresponding to a predetermined data width and formed into "n" banks, "n" being a natural number, by connecting the blocks at every nth block, based on the predetermined data width, and data access, including a pipe-line operation, for respective banks, the data processing system comprising:

pipe-line enable signal generating means for generating a pipe-line enable signal;

a pipe-line bus, coupled to the pipe-line signal generating means and receiving the pipe-line enable signal;

data processing means for detecting a start of the pipe-line operation and for generating a control signal that is active during a number of the clock cycles equal to at least an address first-out number of said pipe-line operation immediately after the start of said pipe-line operation, said data processing means comprising:

address producing means having an input terminal receiving bank information comprising a bank number equal to the "n", for said main memory, a stride value for producing the address, and for generating a signal that designates a data address responsive to an input signal, bus control means for outputting said pipe-line enable signal in response to receiving a data complete signal, for outputting a bus start signal designating a start of said pipe-line operation, a data strobe signal designating a termination of said pipe-line operation, and a read/write display signal designating a read/write operation, and, upon entering a pipe-line cycle of the pipe-line operation, for outputting an address valid signal indicating assertion of a pipe-line address, vector operation means executing vector arithmetic operation in one clock cycle, and load/store pipe means connected to said vector operation means through an inner data bus and exchanging data with said vector operation means using one clock cycle;

indicating signal generating means for generating the data complete signal indicating the completion of the data access of said respective bank;

latch signal generating means for generating an address latch signal in synchronization with the clock signal during a time that one of said control signal and said data complete signal is active; and dividing means for routing said address latch signal to said respective banks.

7. A data processing system as claimed in claim 6, wherein the signal that designates said data address comprises an address, a bus control signal and a bus access type signal.

8. A method of processing data using a pipe-line process in which an address space of a main memory is partitioned into equal blocks based on a predetermined data width, the equal blocks are formed into "n" banks, "n" being a natural number, by connecting the equal blocks at every nth block, and data access, including a pipe-line operation, of respective banks, said method of processing data comprising the steps of:

a first step for starting the pipe-line operation by asserting a pipe-line enable signal that is a dedicated input signal used by a pipe-line bus;

a second step for generating a dedicated address valid signal indicating as valid a pipe-line address upon entering said pipe-line operation;

a third step for generating a bus start signal that is active during a number of cycles equal to at least an address first-out number of said pipe-line address output immediately after the start of said pipe-line operation;

a fourth step for generating a data complete signal indicating completion of the data access for said bank;

a fifth step for generating an address latch signal in synchronization with a clock signal when said dedicated input signal and said data complete signal simultaneously exist or said control signal exists; and a sixth step for routing said address latch signal to respective banks.

9. A method of processing data as claimed in claim 8, wherein the sixth step further comprises the step of routing said address latch signal to respective banks based on contents of the pipe-line address.

10. A method of processing data as claimed in claim 8, wherein if said data complete signal returns in the timing of latching of one of the addresses when the dedicated address valid signal is asserted, said data complete signal is used as one of an address renewal signal and a latch signal of an external circuit.

11. A method of processing data as claimed in claim 8 having a pipe-line number, which determines the pipe-line operation of the respective banks, equal to "1" without a wait state, wherein a start of said pipe-line operation is indicated by asserting said pipe-line enable signal, and in response thereto said address valid signal is asserted, said bus start signal is asserted to enable latching of the address first-out number;

address data immediately after the start of said pipe-line operation is latched for one clock cycle in response to said bus start signal, and the address data during said pipe-line operation is latched at every clock pulse in response to said address valid signal and said data complete signal.

12. A method of processing data as claimed in claim 8 having a pipe-line number, which determines the pipe-line operation of the respective banks, equal to "1" with one wait state and having said data complete signal generated with a delay of one clock cycle, wherein a start of said pipe-line operation is indicated by asserting said pipe-line enable signal, and in response thereto said address valid signal is asserted, for second and thereafter address data during said pipe-line operation, and third and thereafter address data are latched at every second clock pulse in response to said address valid signal and said data complete signal, one clock pulse being asserted during each clock cycle.

13. A method of processing data as claimed in claim 8 having a pipe-line number, which determines the pipe-line operation of the respective banks, equal to "2" without a wait state and the "n" being at least 2, wherein said bus start signal is asserted as long as two clock cycles immediately after said pipe-line operation is started by asserting said pipe-line enable signal;

two address data produced during said pipe-line operation are latched at every clock pulse in response to said bus start signal, and remaining address data on and after fourth address data are latched at every clock pulse by said data complete signal, one clock pulse being asserted during each clock cycle.

14. A method of processing data as claimed in claim 8 having a pipe-line number, which determines the pipe-line operation of the respective banks, equal to "2" with one wait state and the "n" being at least 2, wherein a start of said pipe-line operation is indicated by asserting said pipe-line enable signal, and in response thereto said address valid signal is asserted;

an address, including address data, produced by an address first-out operation using said bus start signal is asserted an amount of time too long for the address to be latched in response to said data complete signal and said address valid signal;

address data is latched for one clock cycle in response to said bus start signal immediately after a start of said pipe-line operation;

third and fifth address data are latched at every second clock pulse in response to said address valid signal and said data complete signal; and fourth and sixth address data are latched at every second clock pulse in response to said address valid signal and said data complete signal, one clock pulse being asserted during each clock cycle.

15. A method of processing data as claimed in claim 8 having a pipe-line number, which determines the pipe-line operation of the respective banks, equal to "4" without a wait state and the "n" being at least 2, wherein second to fifth address data are latched at every clock pulse in response to said bus start signal asserted for four pulses immediately after a start of said pipe-line operation, and remaining address data are latched at every clock pulse in response to said data complete signal, one clock pulse being asserted during each clock cycle.

16. A method of processing data as claimed in claim 8 having a pipe-line number, which determines the pipe-line operation of the respective banks, equal to "4" with one wait state and the "n" being at least 2, wherein address data other than a sixth address data are latched at every clock pulse, one clock pulse being asserted during each clock cycle.

* * * * *

UNITED STATES PATENT AND TRADEMARK OFFICE
CERTIFICATE OF CORRECTION

PATENT NO. : 5,586,282
DATED : December 17, 1996
INVENTOR(S) : Hideyuki IINO et al It is certified that error appears in the above-indentified patent and that said Letters Patent is hereby corrected as shown below:

Col. 2, line 5, after "technology" insert --,--.

Col. 3, line 1, after "basis" insert --.--.

Col. 5, line 65, change "In" to --in--.

Col. 7, line 60, after "clock" insert --cycle--, and delete "cycle" after "(".

Col. 9, line 53, change "is and" to --and is--.

UNITED STATES PATENT AND TRADEMARK OFFICE
CERTIFICATE OF CORRECTION

PATENT NO. : 5,586,282

DATED : December 17, 1996

INVENTOR(S) : Hideyuki IINO et al

It is certified that error appears in the above-indentified patent and that said Letters Patent is hereby corrected as shown below:

```
Col. 10, line 7, delete ":";
         line 30, change "basis" to --basic--;
         line 47, delete "to"; and
         line 48, delete "memory".
Col. 11, line 54, delete "a" (second occurrence).
Col. 13, line 26, change "entry" to --entrance--.
```

Signed and Sealed this

Twenty-second Day of July, 1997

*Attest:*

BRUCE LEHMAN

*Attesting Officer*   *Commissioner of Patents and Trademarks*